(12) United States Patent
Tagawa

(10) Patent No.: US 7,677,688 B2
(45) Date of Patent: Mar. 16, 2010

(54) IMAGE FORMING APPARATUS AND CONTROL METHOD THEREOF

(75) Inventor: Yojiro Tagawa, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 11/275,997

(22) Filed: Feb. 9, 2006

(65) Prior Publication Data

US 2006/0176511 A1 Aug. 10, 2006

(30) Foreign Application Priority Data

Feb. 10, 2005 (JP) ............................. 2005-035212

(51) Int. Cl.
*B41J 29/393* (2006.01)
(52) U.S. Cl. ..................... 347/19; 347/107; 347/16; 347/67
(58) Field of Classification Search .............. 347/19, 347/16, 107, 67
See application file for complete search history.

(56) References Cited

U.S. PATENT DOCUMENTS

2003/0227528 A1* 12/2003 Hohberger et al. .......... 347/104
2006/0059375 A1  3/2006 Ooshima et al.

FOREIGN PATENT DOCUMENTS

| JP | 6-325223 | 11/1994 |
| JP | 2003-140548 | 5/2003 |
| JP | 2003140548 A * | 5/2003 |
| JP | 2004-72146 | 3/2004 |

OTHER PUBLICATIONS

"Draft Protocol Specification for a 900 MHz Class 0 Radio Frequency Identification Tag," MIT Auto-ID Center, Feb. 23, 2003, pp. 1-49 (http://www.epcglobalinc.org/standards_technology/secure/v1.0/UHF-class0.pdf).

* cited by examiner

*Primary Examiner*—Matthew Luu
*Assistant Examiner*—Henok Legesse
(74) *Attorney, Agent, or Firm*—Fitzpatrick, Cella, Harper & Scinto

(57) ABSTRACT

When printing an image on a printing sheet, it is judged whether or not an RFID tag has been arranged in the printing sheet. When an RFID tag has been arranged, an image indicating the presence of RFID tag is printed, or an RFID tag cutting assistant line or the like for invalidating RFID tag is printed, whereby the user can easily recognize the presence of RFID tag. Also, the user can easily cut out and invalidate the RFID tag. When the user's information has been recorded on the RFID tag, a mark indicating the writing of information into RFID tag is attached to the printing sheet, whereby the user can easily recognize the presence/absence of information recorded on RFID tag. Consequently, there can be provided a method capable of identifying and easily discarding a printing sheet with RFID tag which can leak out the user's secret, privacy information or the like, and a method for easily judging whether or not ID information has already been recorded on a printing sheet with RFID tag.

14 Claims, 19 Drawing Sheets

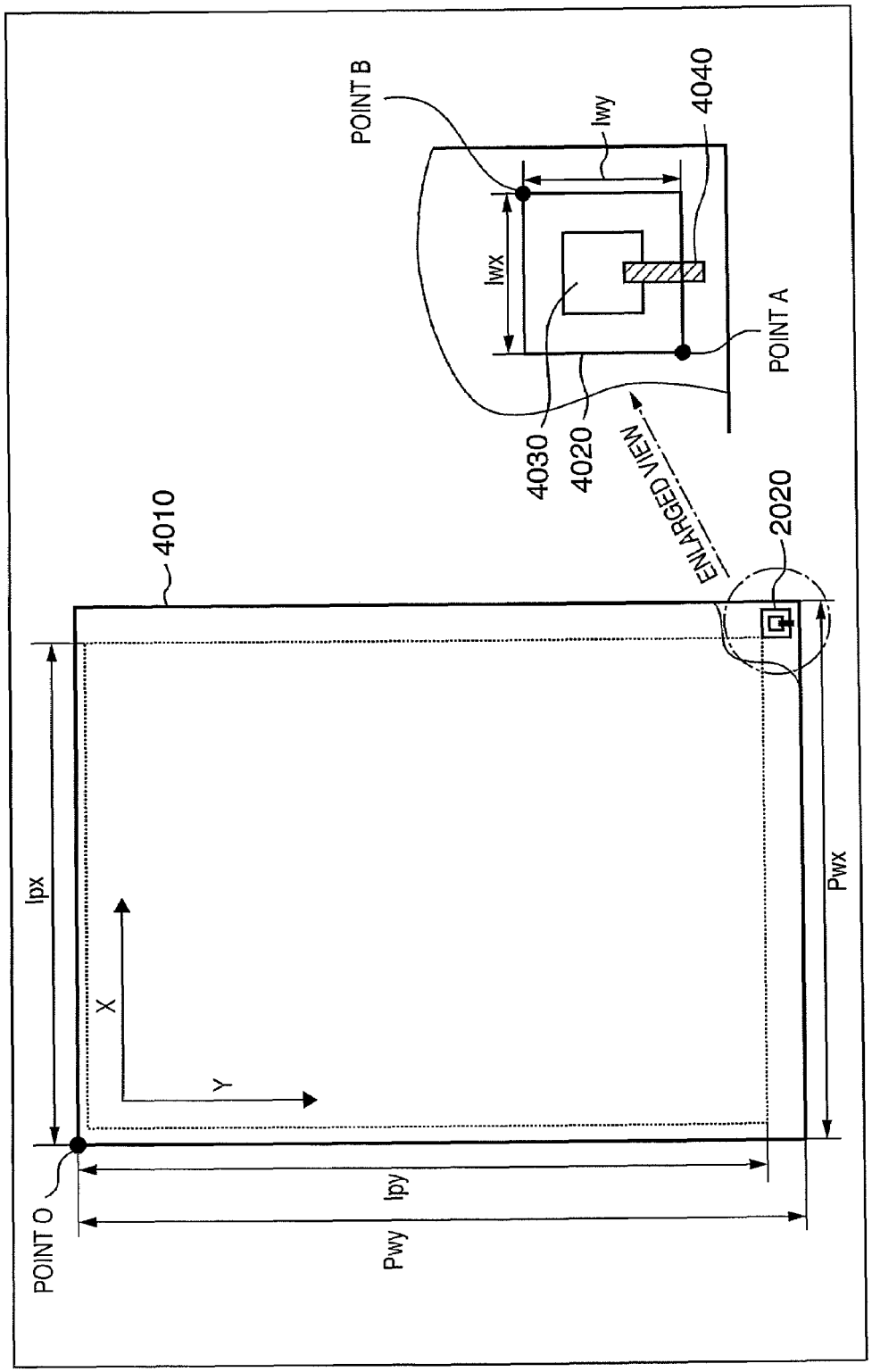

| POSITION INFORMATION | |
|---|---|
| Pwx | 210mm |
| Pwy | 297mm |
| Ipx | 190mm |
| Ipy | 277mm |
| Iwx | 16mm |
| Iwy | 16mm |

4050

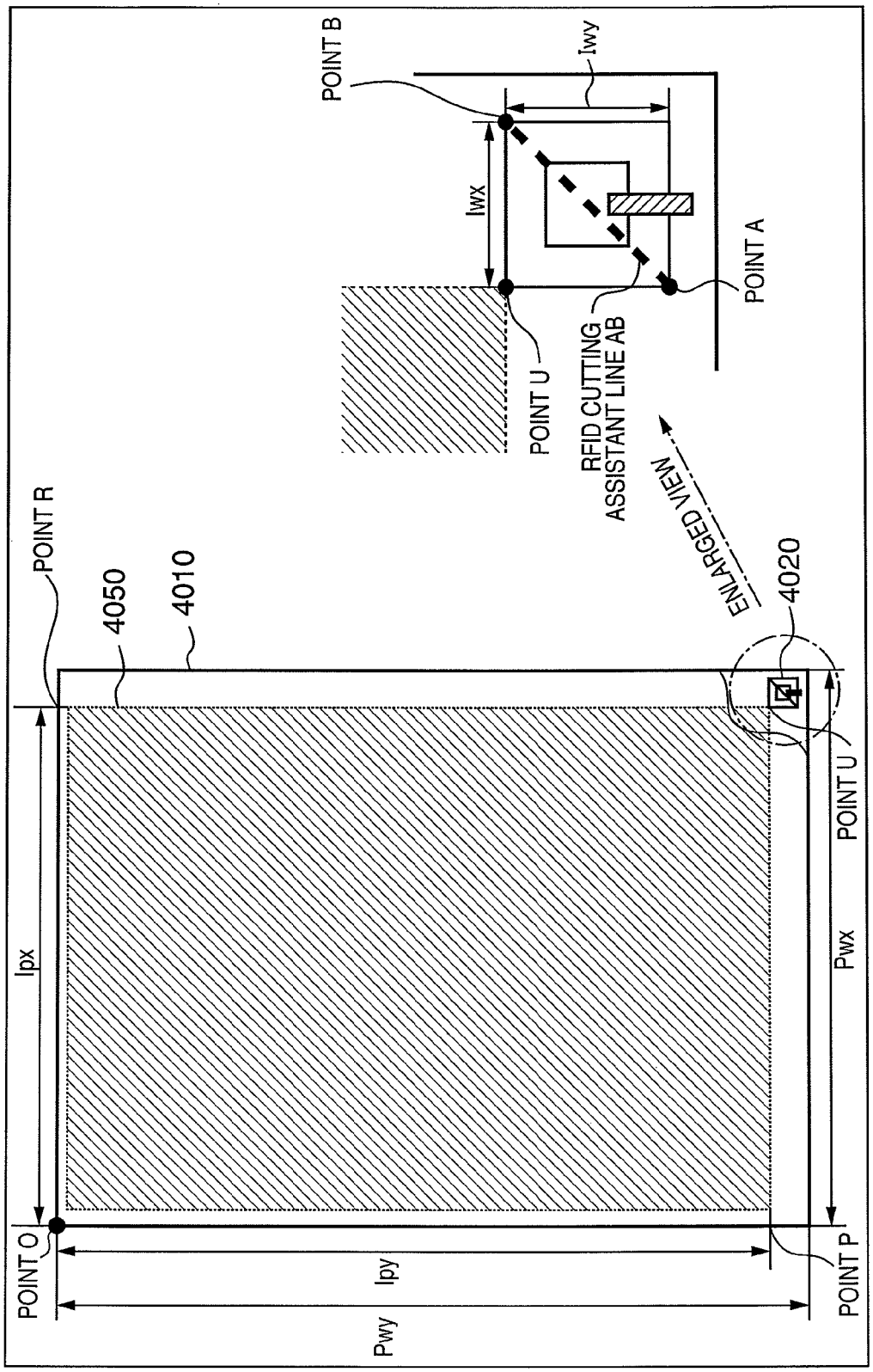

FIG. 13

TABLE REPRESENTING DATA CONFIGURATION OF NONVOLATILE MEMORY UNIT

| | | | | |
|---|---|---|---|---|
| D0010 { ATTRIBUTE INFORMATION | POSITION INFORMATION | Pwx | 210mm | D1010 |
| | | Pwy | 297mm | |
| | | lpx | 190mm | |
| | | lpy | 277mm | |
| | | lwx | 16mm | |
| | | lwy | 16mm | |
| | JAN CODE | COUNTRY CODE | | D1020 |
| | | MAKER CODE | | |
| | | ITEM CODE | | |
| | | CHECK DIGIT | | |
| D0020 { USER INFORMATION | IMAGE INFORMATION | PHOTOGRAPHING DEVICE NAME | | D1030 |
| | | PHOTOGRAPHING DATE | | |
| | | FILE NAME | | |
| | | EXPOSURE VALUE | | |
| | PRINTING INFORMATION | PRINTER NAME | | D1040 |
| | | PRINTING DATE | | |
| | | PRINTING PARAMETER | | |

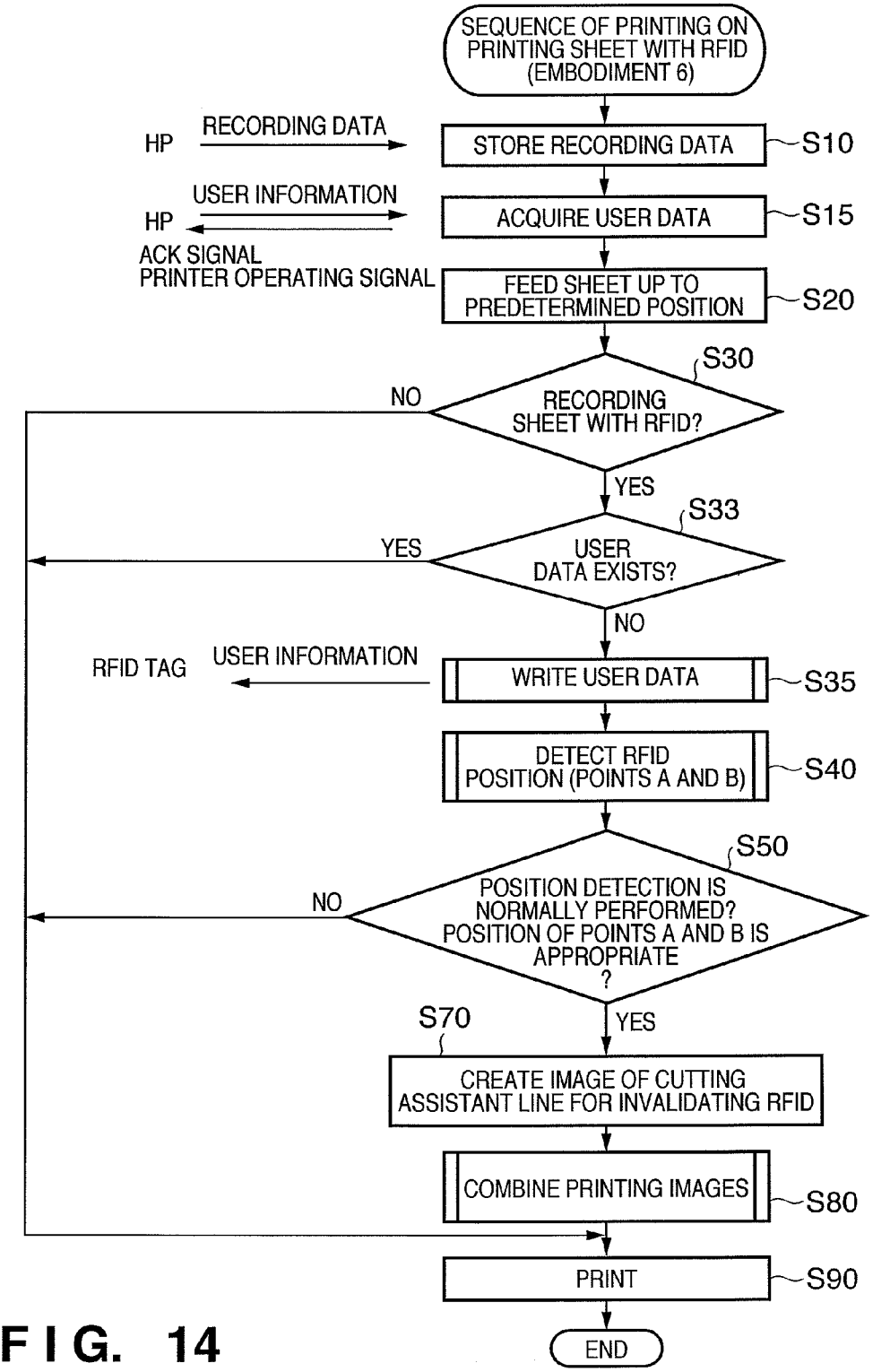
F I G. 14

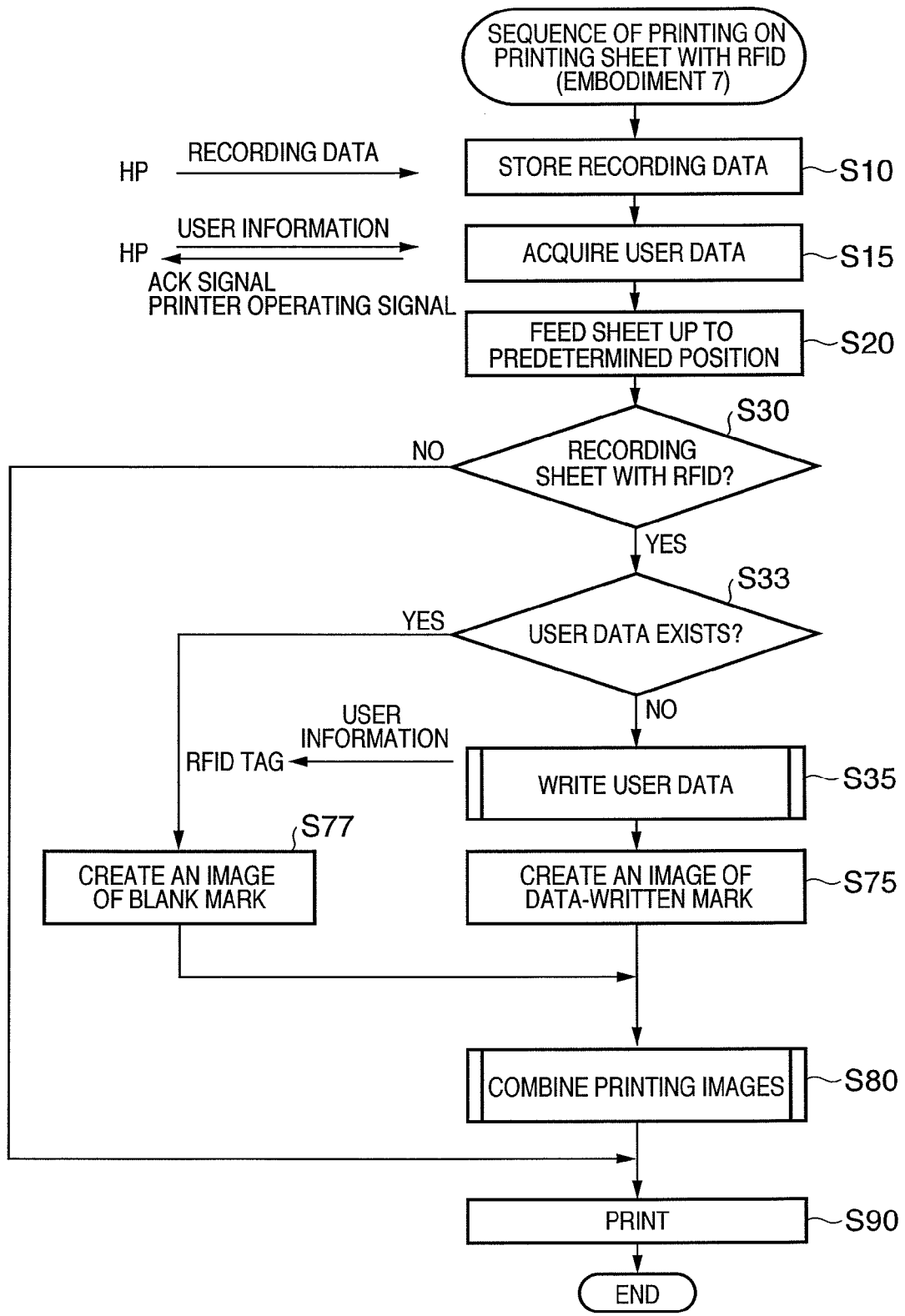
F I G. 15

IMAGE FORMING APPARATUS AND CONTROL METHOD THEREOF

FIELD OF THE INVENTION

The present invention relates to an image forming apparatus capable of performing a printing on a recording medium with RFID tag, a control method, a control program and a recording medium thereof.

BACKGROUND OF THE INVENTION

In recent years, there have been proposed image forming apparatuses in which, by using a recording medium with RFID composed of a recording medium, such as various sheets, having incorporated therein an RFID (Radio Frequency Identification) tag, a printing on the recording medium can be performed and at the same time various information can be written in the RFID tag attached to the recording medium. For example, Patent Document 1 discloses an image forming apparatus in which a label printing on a label sheet with RFID having incorporated therein an RFID tag can be performed and at the same time information can be written in the RFID tag.

Meanwhile, there has also been proposed a method of attaching an RFID tag onto a picture and thereby writing information associated with the picture in the RFID tag. For example, Patent Document 2 discloses a method of performing a picture printing on a recording medium with RFID tag by a digital still camera having incorporated therein a printer.

However, when an RFID tag is incorporated into such product label and picture recording material, the following problems arise. For example, there is a risk in that the tag information is read by a third party without the owner of the printed material having incorporated therein an RFID tag knowing, thus invading the privacy of the owner. Also, when a printed material having incorporated therein an RFID tag is discarded, the information remains in the discarded RFID tag, causing a risk of leakage of information.

Meanwhile, as a countermeasure against leakage of information, methods for invalidating RFID tag have been proposed. In Patent Document 3, there has been proposed a voltage generation method for generating a voltage for breaking or disable a contactless card circuitry. According to the method, an IC tag on a contactless card is physically broken by an applied voltage. In Non-patent Document 1, the Auto-ID Center proposes the RFID tag specification in which the invalidation command is installed in an RFID tag, whereby when a product with RFID tag is purchased, the RFID tag is invalidated in the shop or the like. According to this technique, a specific apparatus (a dedicated apparatus) is used to transmit the Kill command to thereby invalidate the RFID tag.

[Patent Document 1] Japanese Patent Laid-Open No. 2003-140548

[Patent Document 2] Japanese Patent Laid-Open No. 2004-72146

[Patent Document 3] Japanese Patent Laid-Open No. 6-325223

[Non-patent Document 1] 14.4.8 Kill (binary '01 111111 1') "Draft protocol specification for a 900 MHz Class O Radio Frequency Identification Tag" 23 Feb. 2003 (Auto-ID Center) (http://www.epcglobalinc.org/standards_technology/Secur e/v1.0/UHF-class0.pdf)

However, it is difficult for a general user to judge whether or not an RFID tag is attached to the recording medium. Thus, when the printed material or the product label is broken, it is not possible to judge whether or not it is necessary to invalidate it.

According to the conventional technique described above, in order to invalidate the RFID tag, a dedicated apparatus used to invalidate it must be provided. Thus it is not possible for a general user having the printed material or product with RFID tag to easily invalidate the RFID tag at home.

According to the technique in which the visual appearance of RFID tag does not vary, such as the technique of transmitting the Kill command and thereby invalidating RFID tag, it is difficult to confirm whether or not the RFID tag has been surely invalidated, thus causing the user to feel uneasy.

It is also difficult to judge from the visual appearance of the printed material with RFID tag whether or not information has already been written.

SUMMARY OF THE INVENTION

To solve the above described problems in the conventional art, the present invention has been devised, and has an object to provide an image forming apparatus and a control method thereof which performs a recording so as to make it possible for a general user to judge whether or not it is a recording medium (a recording medium with RFID tag composed of a recording medium having attached thereto an RFID tag) having incorporated therein an RFID tag which must be invalidated.

Another object of the present invention is to provide an image forming apparatus and a control method thereof which performs a recording so as to make it possible for a general user to judge whether or not information to be invalidated has already been written in the RFID tag incorporated into the recording medium.

Another object of the present invention is to provide an image forming apparatus capable of providing a method for easily performing an invalidating processing for example using a cutting action or the like, and a method for providing a control method thereof.

To achieve the above object, according to the present invention, there is provided an image forming apparatus forming an image on a recording medium according to an input image signal, the image forming apparatus comprising: radio frequency tag detection means for detecting whether or not a radio frequency tag is arranged in a recording medium supplied for forming an image; and image forming control means for causing an image of additional information indicating the presence of the radio frequency tag on the recording medium to be generated, when it is detected that the radio frequency tag is arranged (Corresponding to First to Eighth Embodiments).

Herein, the image forming apparatus further comprises judging means for judging whether or not significant information to be eliminated exists in the radio frequency tag, and when the judging means judges that significant information exists in the radio frequency tag, the image forming control means causes an image of additional information indicating the presence of the radio frequency tag on the recording medium to be generated. The radio frequency tag includes storage means for storing information, and the judging means judges from data read from the storage means of the radio frequency tag by the radio frequency tag detection means whether or not significant information exists (Corresponding to Fourth Embodiment). The radio frequency tag includes storage means for storing information, and the judging means judges from an operation of storing information into the storage means that significant information exists (Corresponding to Sixth Embodiment). The additional information indicating the presence of the radio frequency tag includes information indicating whether or not significant information exists (Corresponding to Seventh Embodiment).

The radio frequency tag includes storage means for storing information, and the radio frequency tag detection means reads arrangement position information of the radio frequency tag from data stored in the storage means of the radio frequency tag, and based on the arrangement position information, the image forming control means causes an image of additional information serving as a mark of arrangement position of the radio frequency tag to be generated. Herein, the additional information indicating the presence of the radio frequency tag indicates a position where the radio frequency tag can be broken. The additional information indicating the presence of the radio frequency tag includes a cutting assistant line for cutting at least an antenna of the radio frequency tag (Corresponding to Second to Seventh Embodiments).

When image information to be recorded on the recording medium and the additional information overlap, the image forming control means causes an image of the additional information to be generated as a background of the image information or with a color and/or density which does not erase the image information. The image forming control means includes means for performing a control of preventing image information to be recorded on the recording medium and the additional information from overlapping (Corresponding to Third and Fifth Embodiments). The image forming control means includes means for performing a control of causing image information recorded on the recording medium and the additional information to be image-formed on a different surface (Corresponding to Eighth Embodiment). The image forming apparatus further includes recording means for recording image information with the additional information based on a control by the image forming control means.

According to the present invention, there is provided a control method for an image forming apparatus forming an image on a recording medium according to an input image signal, the control method comprising: a radio frequency tag detection step of detecting whether or not a radio frequency tag is arranged in a recording medium supplied for forming an image; and an image forming control step of causing an image of additional information indicating the presence of the radio frequency tag on the recording medium to be generated, when it is detected that the radio frequency tag is arranged.

Herein, the control method further comprises a judging step of judging whether or not significant information to be discarded exists in the radio frequency tag, and when the judging step judges that significant information exists in the radio frequency tag, the image forming control step causes an image of additional information indicating the presence of the radio frequency tag on the recording medium to be generated. The radio frequency tag includes storage means for storing information, and the judging step judges from data read from the storage means of the radio frequency tag by the radio frequency tag detection means whether or not significant information exists. The radio frequency tag includes storage means for storing information, and the judging step judges from an operation of storing information into the storage means that significant information exists. The radio frequency tag includes storage means for storing information, and the radio frequency tag detection step reads arrangement position information of the radio frequency tag from data stored in the storage means of the radio frequency tag, and based on the arrangement position information, the image forming control step causes an image of additional information serving as a mark of arrangement position of the radio frequency tag to be generated. The additional information indicating the presence of the radio frequency tag includes a cutting assistant line for cutting at least an antenna of the radio frequency tag, the cutting assistant line indicating a position where the radio frequency tag can be broken.

According to the present invention, there are also provided a computer-executable control program implementing a control method for the image forming apparatus, and a storage medium storing the control program in a computer-readable manner.

According to the image forming apparatus and the control method thereof described in the present invention, without using a dedicated apparatus or the like, a general user can judge from data recorded oh the recording medium whether or not the RFID tag of the recording medium having incorporated therein an RFID tag is to be invalidated.

According to the image forming apparatus and the control method thereof described in the present invention, a general user can judge whether or not information to be invalidated has already been written in the RFID tag incorporated into the recording medium.

According to the image forming apparatus and the control method thereof described in the present invention, means for performing an invalidating processing, for example using a cutting action or the like, can be easily provided to a general user.

According to the image forming apparatus described in the present invention, a recording medium having incorporated therein an RFID tag can be identified without losing the recorded information.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A is an external view of a printing sheet with RFID tag according to Second Embodiment;

FIG. 8 is an external view of a printing sheet with RFID tag;

FIG. 13 is a table showing a data configuration of a rewritable nonvolatile memory unit disposed within an IC unit of RFID tag;

FIG. 14 is a flowchart showing a printing process according to Sixth Embodiment;

FIG. 15 is a flowchart showing a printing process according to Seventh Embodiment;

DETAILED DESCRIPTION OF THE PREFERRED EMBODIMENTS

Preferred embodiments of an image forming apparatus according to the present invention will be described below in detail with reference to the accompanying drawings, by using an ink jet printer as an example. The image forming apparatus according to the present invention is not limited to an ink jet printer, and may be any printer which can identify a recording medium as a recording medium with RFID tag, such as a laser beam printer or the like.

In the following description, the term "RFID tag" means a tag constituted of an electrical circuit unit including a memory, and an antenna unit, and capable of transmitting/receiving data contained in the memory by radio wave via the antenna unit. The term "recording medium with RFID tag" means a recording medium having a "RFID tag" attached to a predetermined position thereof (for example, incorporated into one end within the recording medium). On the memory of the "RFID tag", there are recorded, for example, the position information of tag (the size of tag, the information on arrangement position, and the like) attached to the recording medium (various sheets, pictures and the like), and other information (image information printed on the recording medium, such as photographing information, printing information, source information, quality information, manufacturing information and the like). Descriptions will be given below by using a sheet with RFID tag as an example of the recording medium with RFID tag.

Example of Configuration of an Image Forming Apparatus According to First Embodiment: Printing of an Image Indicating the Presence of Tag

[Features of the Present Embodiment]

When forming an image on a recording medium, the image forming apparatus according to the present embodiment:
(1) judges whether the recording medium is a recording medium with RFID tag or one without RFID tag; and
(2) when it is judged that the recording medium is a recording medium with RFID tag, prints on the recording medium with RFID tag an image indicating the presence of RFID tag (i.e., combines the data indicating the presence of RFID tag with recording data supplied from the host computer, and by using the combined data, simultaneously prints on the recording medium the image and an image indicating the presence of tag). Accordingly, when discarding the recording medium with RFID tag, the user of the present image forming apparatus can break the RFID tag and invalidate (make unreadable) the information contained in the memory of RFID tag, and then discard the recording medium without anxiety. Also, in the image forming apparatus according to the present embodiment, when an ordinary recording medium without RFID tag is used, an ordinary printing can be performed.

An ink jet printer according to the present embodiment will be described below.

Figure 1:
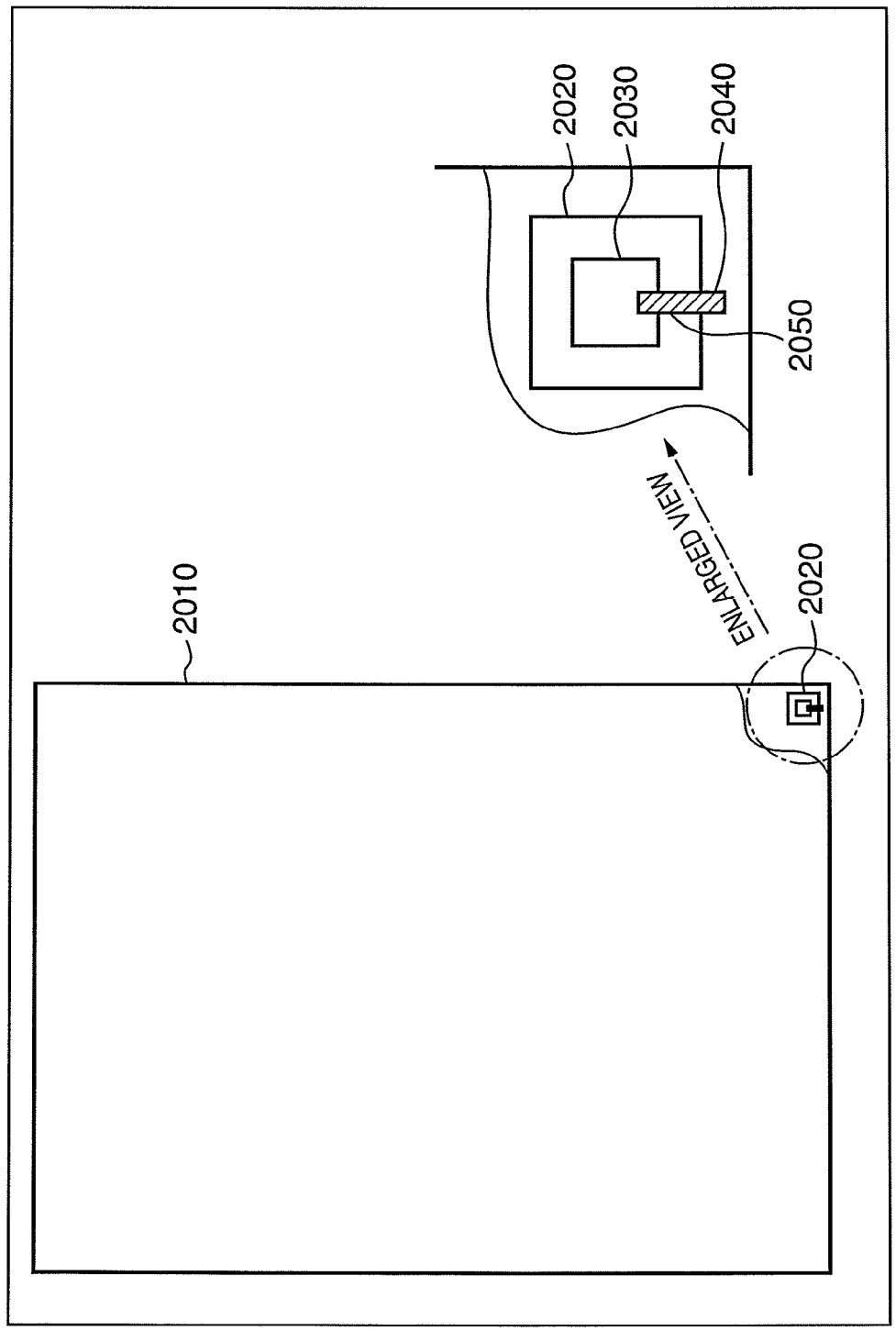
FIG. 1 is an external view of a printing sheet with RFID tag according to the present embodiment.

[Sheet With RFID Tag: FIG. 1]

An exemplary configuration of a sheet P with RFID tag (the term "printing sheet P" is also used below) being an example of recording medium with RFID tag used in the present embodiment is shown in FIG. 1.

Referring to FIG. 1, reference numeral 2010 denotes a printing sheet, and reference numeral 2020 denotes an RFID tag. Reference numeral 2030 denotes an antenna unit of RFID tag which generates electric power according to a radio wave sent from a reader/writer of RFID tag, and at the same time serves to transmit/receive a radio wave used to perform radio communication between the RFID tag and the reader/writer. Reference numeral 2040 denotes an IC chip unit of RFID tag which includes a memory unit 2050 for storing information in the RFID tag. The RFID tag 2020, mounted on the interior of the sheet in a sandwiched manner, is not exposed to the outside.

Figure 2A:
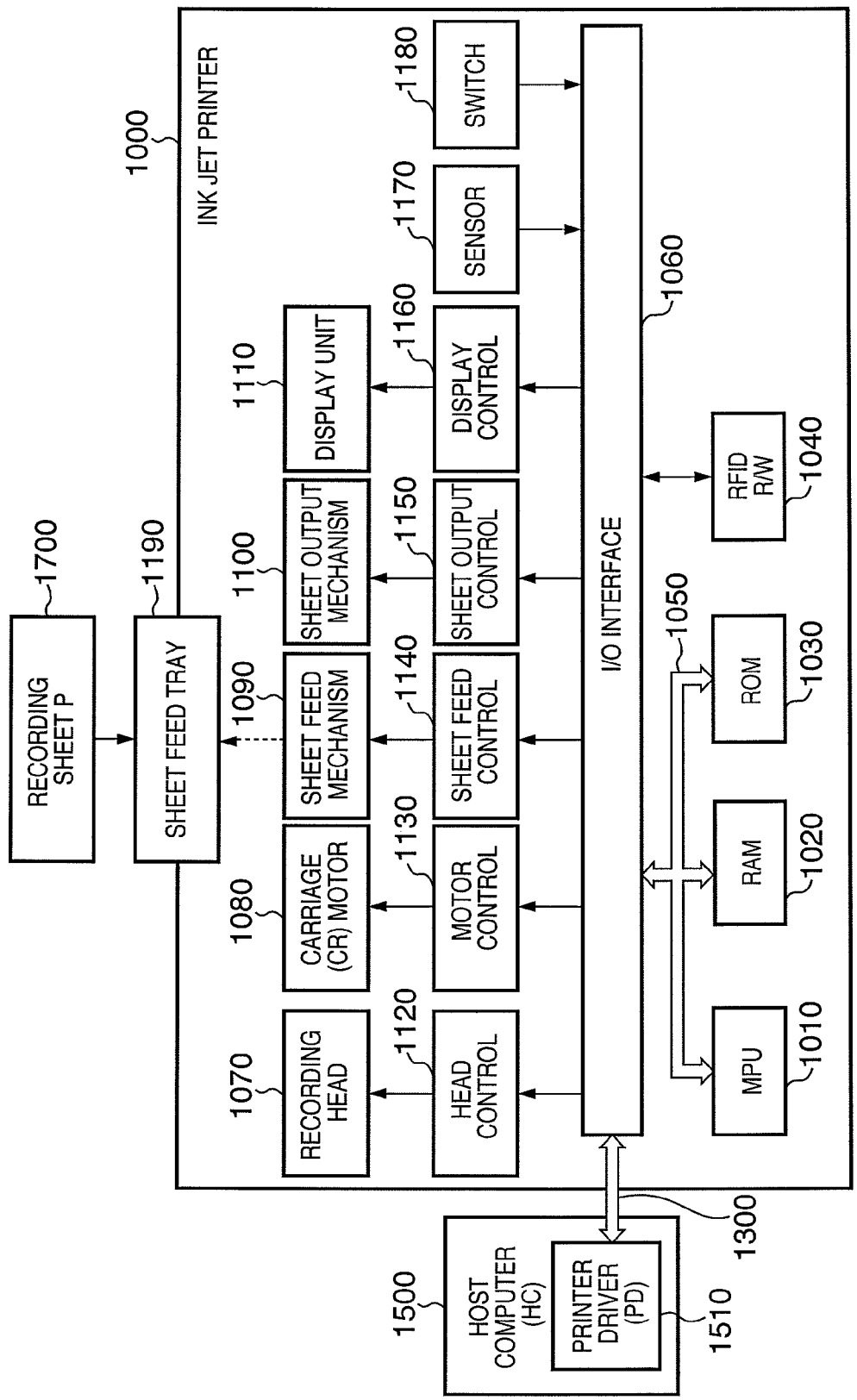
FIG. 2A is a block diagram showing an exemplary configuration of an ink jet printer according to the present embodiment.

[Configuration of an Image Forming Apparatus: FIG. 2A]

An ink jet printer being the image forming apparatus according to the present embodiment will be described. FIG. 2A is a block diagram of an ink jet printer 1000.

As shown in FIG. 2A, the ink jet printer 1000 includes an MPU 1010 which functions as control means for controlling the overall printer. A RAM 1020 and a ROM 1030 are connected to the MPU 1010 via a bus 1050.

The RAM 1020 includes a receiving buffer RB temporarily holding various data, a print buffer PB, and a work RAM WR used as a work area for arithmetic processing associated with various controls. Programs and the like used for various controls are stored in the ROM 1030. Further, an input/output interface 1060 is connected to the MPU 1010 via the bus 1050, and an external host computer HC 1500 is connected to the input/output interface 1060.

A recording head 1070 is connected to the input/output interface 1060 via a head control 1120 and controlled by the MPU 1010. Similarly, a CR motor 1080 for driving a carriage and a sheet feed mechanism 1090 are connected to the input/output interface 1060 via a motor control 1130 and a sheet feed control 1140, respectively. Further, various sensors 1170 and various switches 1180 provided in the ink jet printer 1000 are connected to the input/output interface 1060. A display device 1110 of the ink jet printer 1000 is also connected to the input/output interface 1060 via a display control 1160.

The recording head 1070 is an ink-jettable printer head and supported by a carriage (not shown) capable of performing a scanning in a main scanning direction. The carriage is constructed so that ink tanks (not shown) housing black (Bk), cyan (C), magenta (M) and yellow (Y) inks can be detachably connected to the recording head 1070. The recording head 1070 includes a row of plural nozzles (not shown) provided for each ink color and a heater composed of an electricity-heat exchange element or the like. The carriage (not shown) is slidably supported by a shaft (not shown) and performs a main scanning in an extending direction of the shaft. The carriage can be moved back and forth in a main scanning direction by conveying the output of a carriage (CR) motor 1080 by means of a scanning mechanism including a belt (not shown) and the like. The CR motor 1080 is connected to the input/output interface 1060 via a motor control 1130 and controlled by the MPU 1010.

A sheet feed tray 1190 is disposed in the ink jet printer 1000, and a printing sheet P (1700) used as a recording medium is placed on the sheet feed tray 1190. The printing sheets P placed on the sheet feed tray are isolated one by one by the sheet feed mechanism 1090 having an LF motor (not shown) as the driving source thereof, and then fed (carried) to a recording position facing the recording head 1070 (a row of nozzles of each color). When an image is recorded on a printing sheet P at the recording position, the printing sheet P is supplied to the recording position by the sheet feed mechanism 1090, and at the same time by being driven by the CR motor 1080 acting as the power source, the recording head 1070 starts a predetermined back-and-forth movement.

A head control signal is supplied from the head control 1120 to the recording head 1070. In response to the head control signal, the recording head 1070 jets ink from the nozzles by use of thermal energy generated by the electricity-heat exchange element and forms an image on the printing sheet P. The printing sheet P having formed therein the image is discharged by a sheet output mechanism 1100.

Figure 2B:
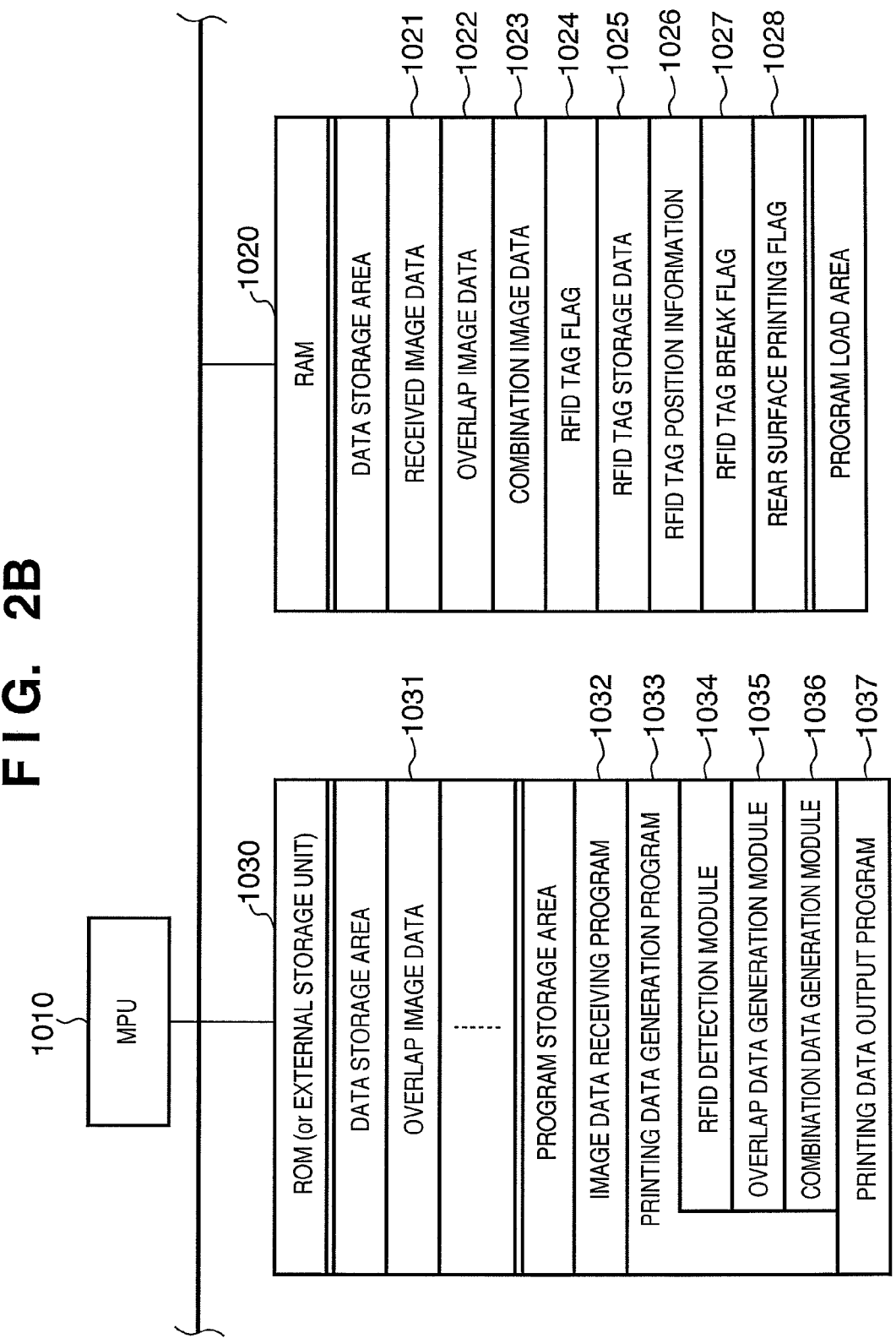
FIG. 2B is a view showing an exemplary storage configuration of RAM and ROM.

[Example of Configuration of Storage Unit (ROM, RAM): FIG. 2B]

An example of programs executed by the MPU 1010 controlling the image forming apparatus 1000 of FIG. 2A, and an example of storage configuration in the data storage unit (ROM, RAM) are shown in FIG. 2B. Referring to FIG. 2B, the programs are stored in the ROM 1030. However, the programs may be prepared in an external storage unit, such as a disk, and loaded into the RAM 1020 before being executed.

The ROM 1030 (or the external storage unit) includes a data storage area and a program storage area. For example, when the image indicating the presence of RFID tag is composed of characters and pictorial figures, the overlap image data 1031 is stored in the data storage area. In addition to system programs including the OS, an image data receiving program 1032, executed in the present embodiment, for receiving image data to be printed, sent from the host computer 1500, and a printing data generation program 1033 for generating printing data to be printed, and a printing data output program for outputting the generated printing data are stored in the program storage area. The printing data generation program 1033 includes an RFID detection module 1034 unique to the present embodiment, an overlap data generation module 1035 and a combination data generation module 1036. In an embodiment described later where an image related to RFID tag is printed on the rear surface, the combination data generation module 1036 is not required.

The RAM 1020 includes a data storage area and a program load area. In the data storage area, there are stored data and flags required for various embodiments described below. These data and flags include received image data 1021 received from the host computer 1500, overlap image data 1022 representing an image related to RFID tag, combination image data 1023 obtained by combining the received image data and the overlap image data, an RFID tag flag 1024 indicating whether or not the recording medium on which a printing is to be performed includes RFID tag, RFID storage data 1025 which is to be stored or has been stored in the storage unit of RFID tag, RFID tag position information 1026 indicating a position of RFID tag on the recording medium, RFID tag break flag 1027 indicating based on the storage content of the RFID tag of the recording medium, whether or not the RFID tag must be broken, and a rear-surface printing flag 1028 indicating whether or not a later-described image related to RFID tag is to be printed on the rear surface.

Figure 3:
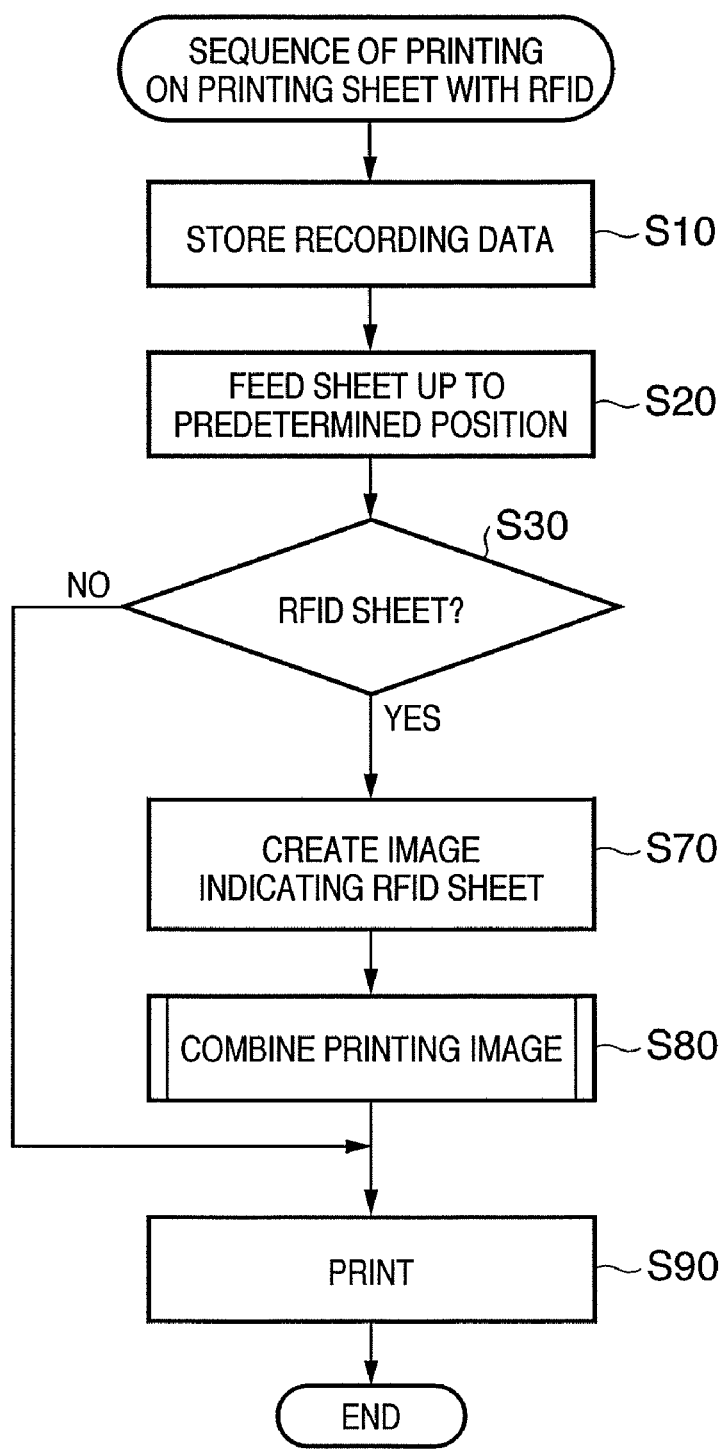
FIG. 3 is a flowchart showing a printing process according to First Embodiment.

[Printing of an Image Indicating the Presence of Tag on a Sheet With RFID Tag: FIG. 3]

With reference to a flowchart of FIG. 3, there will be described a method for combining an image and a display image allowing the presence of RFID tag to be easily recognized and printing the combined image, when the image is printed on a printing sheet P (a recording medium with RFID tag) by the ink jet printer 1000 according to the present embodiment. The processes shown in FIG. 3 are executed based on a control program stored in the ROM 1030 by the MPU 1010 using the RAM 1020 as a work area and controlling each unit.

[Step S10: Data Reception by the Printer]

Character and image data (bit map data and the like, hereinafter referred to as "recording data") to be recorded on the ink jet printer 1000 are sent from the host computer HC 1500 and stored in the receiving buffer RB of the RAM 1020 via the input/output interface 1060. In this case, the MPU 1010 sends back to the host computer 1500 a signal for confirming that the data has been normally transferred, and a signal and the like indicating the operating state of the printer 1000.

[Step S20: Feeding of Sheet With RFID Tag]

Subsequently, after at least a predetermined number of rasters of (hereinafter referred to as "a predetermined rasters of") recording data is stored in the receiving buffer RB, the MPU 1010 of the printer 1000 controls the sheet feed mechanism 1090 via the sheet feed control 1140 and feeds (carries) a printing sheet P from the sheet feed tray 1190 to a first predetermined position.

[Step S30: Reading of RFID Tag]

The MPU 1010 reads the information of RFID tag of the printing sheet P through an RFID tag R/W 1040 connected to the MPU 1010 via the input/output interface 1060. Based on whether or not the data of RFID tag is normally read, the MPU 1010 judges whether or not the printing sheet P is one with RFID tag. When the data of RFID tag is normally read in step S30, the flow proceeds to step S40, and the read data is analyzed to read the information on arrangement position of RFID tag on the printing sheet P. When the information of RFID tag is not normally read, and when the information on arrangement position of RFID tag on the printing sheet P is not normally read, the MPU 1010 judges that the printing sheet P is not one with RFID tag, and the flow jumps to step S90 (printing process) to perform only an ordinary printing operation.

Figure 4:
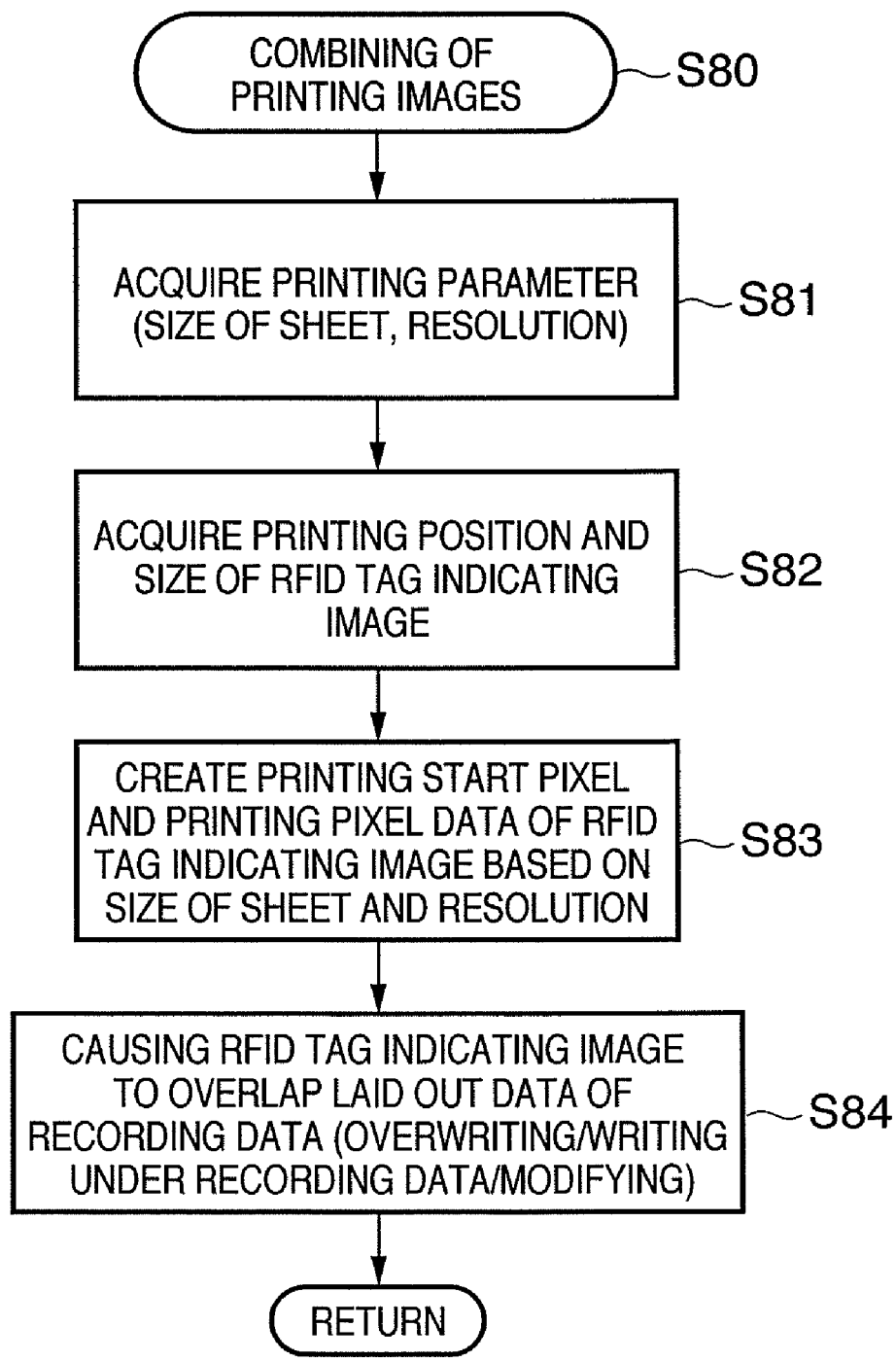
FIG. 4 is a flowchart showing a position control for combining an RFID tag display image with the recorded data in step S80 of FIG. 3.

[Steps S70 and S80: Generating and Combining of RFID Tag Indicating Image: FIG. 4]

Subsequently, in step S70, the MPU 1010 creates a display image indicating the presence of RFID tag as the information used at the time of printing an image, and causes it to overlap the recording data. The display image indicating the presence of RFID tag may be composed of characters or pictorial figures. The overlap position may be in the peripheral part or in the inner side of the printing sheet P. For example, when the printing data is of a document, transparent color characters or pictorial figures may be made to overlap the entire printing sheet P. It is sufficient to have a visually exaggeratable display image causing the user to clearly recognize the presence of RFID tag at the time of discarding the printed material. For example, the display image is preferably disposed in the same row or column as the arrangement position of RFID tag so that the arrangement position of RFID tag or the position thereof can be recognized. Further, it is possible that the display image not only indicates the presence of RFID tag but also includes the contents notifying the storage condition of the RFID tag or the breaking method.

Subsequently, in step S80, the created display image indicating the presence of RFID tag is combined with the recording data. The position control performed for combining the image indicating the presence of RFID tag with the recording data in step S80 will be described below with reference to a flowchart of FIG. 4. The process of combining a printing image (S80) and that of creating a printing image (S80') according to Second to Seventh Embodiments described below are also similarly performed.

In step S81, the size of sheet, the resolution, and so on are acquired as printing parameters. In step S82, the printing position of the RFID tag indicating image (or a cutting assistant line for assisting to cut, described below) created in the previous step and the size of pictorial figure (line) and character are acquired.

In step S83, the start position of the RFID tag indicating image in the printing pixel data (bit map data) and the pixel data are created from the size of sheet and the resolution, and the printing position and size of the RFID tag indicating image. When a cutting assistant line described below is used, it is preferable that the pixel data and the bit map of each pixel data address are created.

There will be shown below an example of creating the start position and the pixel data when pictorial figures and a row of characters are used. By way of example, assume that: the size of sheet is A4; the printing resolution is 600 dpi; the RFID tag indicating image has its original point in the upper left of the sheet, and the upper-left start position thereof is laterally at 190 mm and longitudinally at 10 mm; and the ID character is printed 20 mm wide by 10 mm high. When the settings for a blank space and the like are omitted to avoid complications, the RFID tag indicating image is an image of which the ID fonts are laid out in a range of 25 lines (from the 24-th line ($\leq 10 \times 600/254$) to the 47-th line ($\leq 20 \times 600/254$) in a slow scan direction) by 50 pixels (from the 448-th pixel ($\leq 190 \times 600/254$) to the 496-th pixel ($\leq 210 \times 600/254$) in a main scanning direction). The method of this example is commonly used in the other cases including one in which a cutting assistant line is used.

In step S84, the created pixel data is made to overlap the bit map of the recording data to thereby obtain the combined printing image data. As the overlapping technique of causing significant recording data to overlap an RFID tag indicating image, there are some methods; the RFID tag indicating image is overwritten on the recording data or written under the recording data (constitutes the background of the recording data), or the overlapping part is reversed or has a different color. For example, when transparent color characters and pictorial figures as described above overlap the entire printing sheet P, it is preferable that they constitutes the background of the recording data. As shown in an example using a cutting assistant line described below, the printing position may be adjusted or the size of the recording data may be reduced so that significant recording data does not overlap an RFID tag indicating image.

[Step S90: Printing]

Subsequently, in step S90, the MPU 1010 converts the combined recording data to jetting data for each ink, sends the print jetting data to the head drive at a predetermined timing, and at the same time by use of the motor control and the sheet feed control, causes the CR motor 1080 and the LF motor (not shown) to operate, whereby an image recording on the printing sheet P is performed, and the printing is thus executed.

Summary

In the ink jet printer 1000 according to the present embodiment, (1) it is judged whether or not the recording medium used to form an image is one with RFID tag, and (2) when it is judged that an RFID tag is provided, a display image indicating the presence of RFID tag can be printed on the recording medium with RFID tag together with the image. Thus, when the recording medium with RFID tag is unused and discarded, the user of the present image forming apparatus knows the presence of RFID tag to be invalidated in the recording medium, and thus can easily recognize that the RFID tag must be broken. Accordingly, the user can perform a cutting or the like of the RFID tag and thereby invalidate (make unreadable) the information contained in the memory of RFID tag, and then discard the recording medium without anxiety.

In the above description of the present embodiment, a case in which a sequence of the processes shown in the flowchart of FIG. 3 are performed in the ink jet printer 1000 side was taken as an example. However, the present invention is not limited to this example. For example, all or part of a sequence of the processes shown in the flowchart of FIG. 3 may be executed by a printer driver PD in the host computer HC side.

In the above description of the present embodiment, the image data indicating the presence of RFID tag is made to overlap the recording data on the same printing surface. However, the present invention is not limited to this example. The image data indicating the presence of RFID tag may be printed on the reverse of the printing surface of the recording data (Rear-surface printing will be described below as another embodiment).

Example of Configuration of an Image Forming Apparatus According to Second Embodiment:
Printing of a Cutting Assistant Line for Assisting to Cut

[Features of the Present Embodiment]

When forming an image on a recording medium, the image forming apparatus according to the present embodiment:

(1) judges whether the recording medium is a recording medium with RFID tag or one without RFID tag; and (2) when it is judged that the recording medium is a recording medium with RFID tag, prints a cutting assistant line indicating the cutting position of RFID tag on the recording medium with RFID tag together with the image (i.e., causes data indicating an RFID tag cutting assistant line to overlap the recording data sent from the host computer, and by use of the overlapping data, prints simultaneously the image and the cutting assistant line on the recording medium). Accordingly, when discarding the recording medium with RFID tag, the user of the present image forming apparatus can cut out the RFID tag along the cutting assistant line printed on the recording medium and invalidate (make unreadable) the information contained in the memory of RFID tag, and then discard the recording medium without anxiety. Also, in the image forming apparatus according to the present embodiment, when an ordinary recording medium without RFID tag is used, an ordinary printing can be performed.

The ink jet printer according to the present embodiment will be described below. However, the ink jet printer according to the present embodiment is similar to the ink jet printer according to First Embodiment, so an explanation of the corresponding drawings and details thereof will be omitted. Only the differences will be described below.

Figure 5:
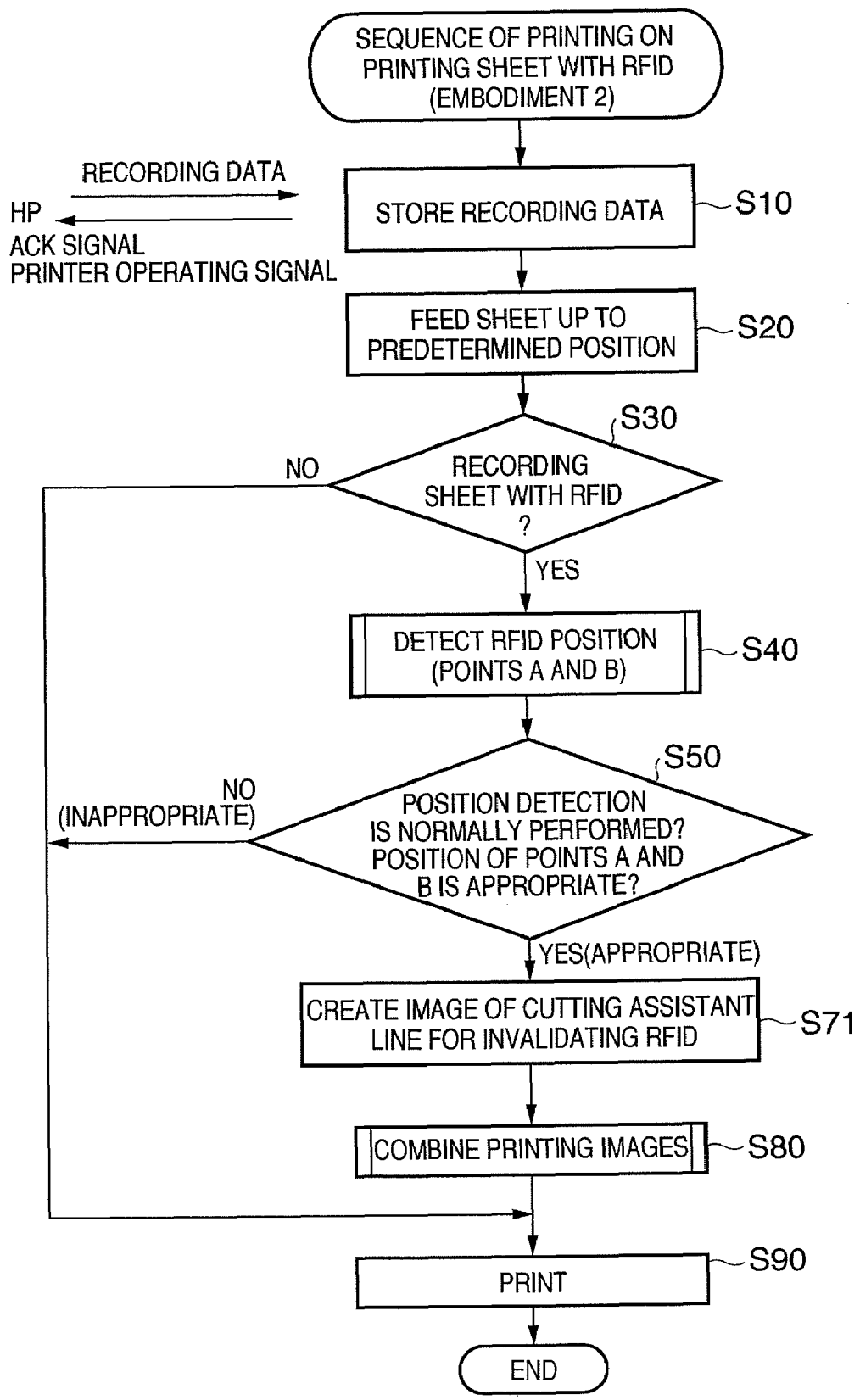
FIG. 5 is a flowchart showing a printing process according to Second or Third Embodiment.

[Printing of a Cutting Assistant Line on a Sheet With RFID Tag: FIG. 5]

With reference to a flowchart of FIG. 5, there will be described a method for combining an image and a cutting assistant line allowing unused RFID tag to be easily cut out and printing the combined image, when the image is printed on a printing sheet P (a recording medium with RFID tag) by an ink jet printer 1000 according to the present embodiment. The processes shown in FIG. 5 are executed by the MPU 1010 based on the control program stored in the ROM 1030 while using the RAM 1020 as a work area and controlling each unit.

[Steps S10 to S30]

The processes from step S10 to step S30 shown in FIG. 5 are similar to those from step 510 to step S30 of First Embodiment shown in FIG. 3, and hence repeated explanation thereof is omitted here.

[Steps S40 and S50: Detection of RFID Tag Position: FIG. 6]

The RFID tag position detection processes of steps S40 and S50 will be described with reference to FIG. 6. A FIG. 4010 of FIG. 6 is an external view showing an example of printing sheet P having mounted thereon an RFID tag. The printing sheet P has an RFID tag 4020 mounted in the interior of paper in the lower-right thereof. The RFID tag 4020 is mounted in the interior of paper in a sandwiched manner, and thus not exposed to the outside. Reference numeral 4030 denotes an antenna unit of the RFID tag 4020, and reference numeral 4040 denotes an IC chip unit of the RFID tag. The information on arrangement position of RFID tag is recorded on a memory within the IC chip unit 4040. Reference numeral 4050 denotes recording contents of the information on arrangement position of RFID tag, and is contained in the RFID tag information read by the MPU 1010.

Figure 6B:
FIG. 6B is a table showing an example of values of position information written in the RFID tag.

Referring to FIG. 6B, data Pwx, Pwy, Ipx, Ipy, Iwx and Iwy are stored in the position information, and each has the following meaning.

Pwx: Lateral length of sheet P (mm)
Pwy: Longitudinal length of sheet P (mm)
Ipx: Coordinate position indicating the lateral position of RFID tag on sheet P (mm)
Ipy: Coordinate position indicating the longitudinal position of RFID tag on sheet P (mm)
Iwx: Lateral length of the antenna unit of RFID tag (mm)
Iwy: Longitudinal length of the antenna unit of RFID tag (mm)

Based on the above data, the MPU 1010 calculates the position of points A and B being vertexes at opposite angles of the antenna unit of RFID tag by using the following formula. The coordinates of points A and B are calculated with reference to a vertex (point O) positioned in the upper-left of sheet.
Point A(Xa, Ya)=(Ipx, Ipy+Iwy)
Point B(Xb, Yb)=(Ipx+Iwx, Ipy)

When a calculation is made based on the position data of FIG. 6,
(Xa, Ya)=(190, 277+16)=(190, 293)
(Xb, Yb)=(190+16, 277)=(206, 277)

The position detection process is performed in step S40 in this manner, and then the flow proceeds to step S50. When it is judged in step S50 that the position detection has been normally performed (i.e., that a combination of values of Pwx, Pwy, Ipx, Ipy, Iwx and Iwy described above is appropriate), the flow proceeds to step S70. When a combination of values of Pwx, Pwy, Ipx, Ipy, Iwx and Iwy described above is not appropriate (for example, when the value of Ipx is larger than that of Pwx), the MPU 1010 judges that the position detection has not been normally performed, so only an ordinary printing operation is performed. Thus the flow jumps to the printing process (step S90).

In the above described position detection of RFID tag, the detection is performed based on the position information preliminarily stored in RFID tag. Alternatively, the position detection may be performed based on transmitting/receiving state of the RFID tag R/W 1040 to/from RFID tag.

[Steps S71 and S80: Creation of an RFID Tag Cutting Assistant Line for Assisting to Cut]

Subsequently, in step S71, the MPU 1010 defines a straight line passing through points A and B as the RFID tag cutting assistant line, and determines the assistant line AB shown in FIG. 6A based on the above described coordinates A (Xa, Ya) and B (Xb, Yb). The MPU 1010 creates the determined assistant line AB as the information used at the time of printing an image, and causes it to overlap the recording data.

Subsequently, in step S80, the assistant line AB passing through points A and B, i.e., the assistant line AB diagonally passing through the antenna of RFID tag is defined as the RFID tag cutting assistant line and combined with the recording data.

Figure 7B:
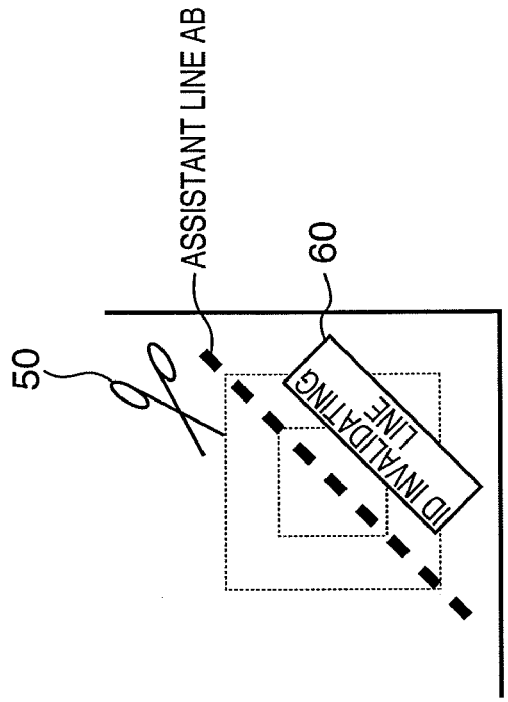
FIGS. 7A and 7B are views showing an assistant line AB being an RFID tag cutting assistant line for assisting to cut.
Figure 7A:
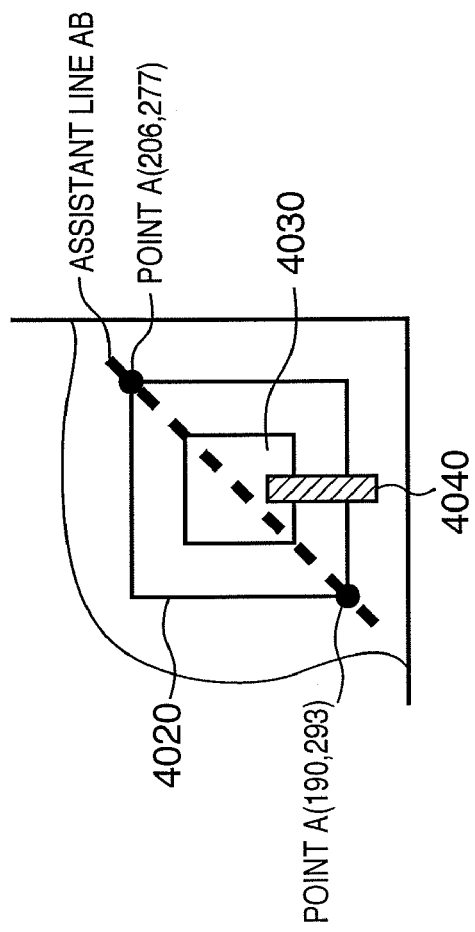

In addition to the assistant line AB shown in FIG. 7A, a pictorial icon 50 or a character icon 60 shown FIG. 7B may be created as the information used at the time of printing an image, and added to the recording data, whereby the assistant line AB can be visually emphasized to be an RFID tag cutting assistant line.

[Step S90: Printing]

Subsequently, in step S90, the MPU 1010 prints the combined recording data. Details of step S90 are similar to those of First Embodiment, and hence an explanation thereof is omitted.

Summary

In the ink jet printer 1000 according to the present embodiment, (1) it is judged whether or not the recording medium used to form an image is one with RFID tag, and (2) when it is judged that an RFID tag is provided, a cutting assistant line indicating the RFID tag cutting position can be printed on the recording medium with RFID tag together with the image. Thus, when the recording medium with RFID tag is unused and discarded, the user of the present image forming apparatus knows the presence of RFID tag to be invalidated in the recording medium, and thus can easily recognize that the RFID tag must be broken. There is a method of particularly easily invalidating RFID tag; the user can cut out the RFID tag along the cutting assistant line preliminarily printed on the recording medium and thereby invalidate (make unreadable) the information contained in the memory of RFID tag, and then discard the recording medium without anxiety.

In the above description of the present embodiment, a case in which a sequence of the processes shown in the flowchart of FIG. 5 are performed in the ink jet printer 1000 side was taken as an example. However, the present invention is not limited to this example. For example, all or part of a sequence of the processes shown in the flowchart of FIG. 5 may be executed by a printer driver PD in the host computer HC side.

In the above description of the present embodiment, the image data of an RFID tag cutting assistant line is made to overlap the recording data on the same printing surface. However, the present invention is not limited to this example. The image data of an RFID tag cutting assistant line may be printed on the reverse of the printing surface of the recording data.

In the above description of the present embodiment, a case in which the position of RFID tag on the printing sheet P is detected based on the position information written in RFID tag was taken as an example. However, the present invention is not limited to this example. For example, the arrangement position of RFID tag may be detected by another means such as optical position reading means or electromagnetic position reading means.

Example of Configuration of an Image Forming Apparatus According to Third Embodiment; Setting of the Position and Size of Printing Image

[Features of the Present Embodiment]

In a ink jet printer according to the present embodiment, when the recording medium is provided with RFID tag, similarly to the ink jet printer according to First or Second Embodiment, an image indicating the presence of RFID tag or an RFID tag cutting assistant line is made to overlap an image sent from the host computer before being printed, whereby an image for invalidating RFID tag can be printed on the recording medium. Further, in the ink jet printer according to the present embodiment, the printing position and size of an image sent from the host computer can be determined according to the printing position of an overlapping image or the arrangement position of RFID tag on the recording medium.

The ink jet printer according to the present embodiment will be described below. However, the ink jet printer according to the present embodiment is similar to the ink jet printer according to First and Second Embodiments, so an explanation of the corresponding drawings and details thereof will be omitted. Only the differences will be described below.

The present embodiment will be described by taking as an example a case in which a control is performed so that a cutting assistant line is made not to overlap the printing image. However, the present embodiment is not limited to the use of a cutting assistant line. The present embodiment can be applied to a case in which a control is performed so that characters or pictorial figures indicating the presence of RFID tag according to First Embodiment are made not to overlap the printing image.

[Printing of a Cutting Assistant Line on a Sheet With RFID Tag: FIG. 4]

With reference to a flowchart of FIG. 4, there will be described a method for combining an image and a cutting assistant line allowing unused RFID tag to be easily cut out and printing the combined image, when the image is printed on a printing sheet P (a recording medium with RFID tag) by the ink jet printer 1000 according to the present embodiment.

[Steps S10 to S71]

The processes from step S10 to step S71 shown in FIG. 4 are similar to those of Second Embodiment, and hence repeated explanation thereof is omitted here.

[Step S80]

Subsequently, in a printing image combining process of step S80, the MPU 1010 combines images by a different method from that of Second Embodiment.

More specifically, based on the information on arrangement position of RFID tag preliminarily detected in step S40, point U shown in FIG. 8 (i.e., the vertex of RFID tag closest to the center of the printing sheet P) is determined. Subsequently, the MPU 1010 arranges as the image area to be recorded on the printing sheet P, an area indicated by hatching (an area indicated by reference numeral 4050 in FIG. 8) and formed by this point U and points O, R and P of FIG. 8.

By using recording data sent from the host computer and stored in the memory, the MPU 1010 sets the printing start position and the printing size so that the recording data fits into the area indicated by hatching and formed by points O, R, P and U of FIG. 8. The MPU 1010 combines the RFID tag cutting assistant line created in step S70 passing through points A and B with the printing image of the recording data arranged according to the printing position and size of image of the above recording data, and thereby creates a printing image to be printed on the printing sheet P.

[Step S90: Printing]

Subsequently, in step S90, the MPU 1010 prints the combined recording data. Details of step S90 are similar to those of First Embodiment, and hence an explanation thereof is omitted.

Summary

As described above, in the ink jet printer according to the present embodiment, the image area of recording data is disposed so that it does not overlap an image indicating the presence of RFID tag or an RFID tag, whereby the image indicating the presence of RFID tag or the RFID tag cutting assistant line AB can be printed while the image indicating the presence of RFID tag or the RFID tag cutting assistant line AB never overlaps the printing image of recording data.

Example of Configuration of an Image Forming Apparatus According to Fourth Embodiment: Analyzing of Information Stored in RFID Tag

[Features of the Present Embodiment]

In a ink jet printer according to the present embodiment, when the recording medium is provided with RFID tag, similarly to the ink jet printer according to First or Second Embodiment, an image indicating the presence of RFID tag or an RFID tag cutting assistant line is made to overlap an image sent from the host computer before being printed, whereby the image indicating the presence of RFID tag or the cutting assistant line for invalidating RFID tag can be printed on the recording medium. In this case, only when information to be broken is recorded on the RFID tag of the printing sheet P, the overlapping image is printed.

The ink jet printer according to the present embodiment will be described below. However, the ink jet printer according to the present embodiment is similar to the ink jet printer according to First Embodiment, so an explanation of the corresponding drawings and details thereof will be omitted. Only the differences will be described below. An example of printing a cutting assistant line of Second Embodiment will be shown below. However, an application to First Embodiment is also possible.

Figure 9:
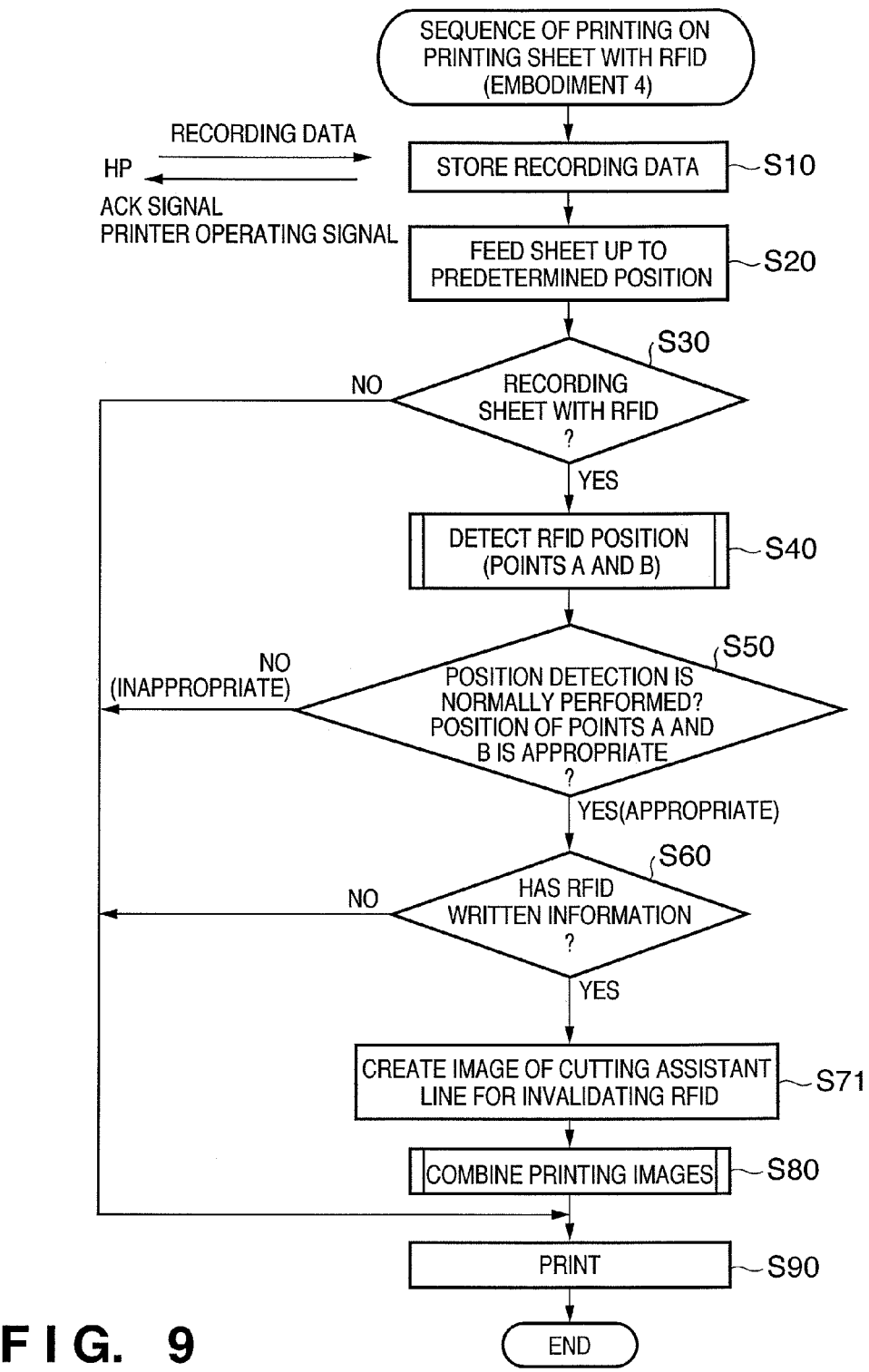
FIG. 9 is a flowchart showing a printing process according to Fourth Embodiment.

[Printing of a Cutting Assistant Line on a Sheet With RFID Tag: FIG. 9]

With reference to a flowchart of FIG. 9, there will be described a method for combining an image and a cutting assistant line allowing unused RFID tag to be easily cut out and printing the combined image, when the image is printed on a printing sheet P (a recording medium with RFID tag) by an ink jet printer 1000 according to the present embodiment. The processes shown in FIG. 9 are executed based on a control program stored in the ROM 1030, by the MPU 1010 in FIG. 2 using the RAM 1020 as a work area and controlling each unit.

[Steps S10 to S50]

The processes from step S10 to step S50 shown in FIG. 9 are similar to those from step S10 to step S50 of Second Embodiment shown in FIG. 4, and hence repeated explanation thereof is omitted here.

[Step S60]

Subsequently, in step S60, the MPU 1010 analyzes the information recorded on RFID tag and judges whether or not information to be broken has been written therein, such as privacy-related information or classified information: (1) information specifying the article number of printing sheet P (JAN code and the like); (2) information related to the printing information recorded on printing sheet P (the file name of printing image, and the like); (3) personal information (image creator, printer and the like) (refer to FIG. 13).

[Steps S71 to S90]

When it is judged in step S60 that information to be broken has been written, the flow proceeds to step S71, and steps S71 and S80 are executed. Then the flow proceeds to step S90. Here, the processes from step S71 to step S90 shown are similar to those from step S71 to step S90 described in FIG. 4, and hence repeated explanation thereof is omitted here.

When it is judged in step S60 that information to be broken has not been written, i.e., that the RFID tag includes no information or does not include information to be broken, information related to RFID tag is not added, and the flow jumps to step S90 to perform a printing.

Summary

As described above, in the ink jet printer according to the present embodiment, only when predetermined information, i.e., significant information is recorded on the RFID tag of printing sheet P, an image indicating the presence of RFID tag or an RFID tag cutting assistant line is made to overlap the recording data sent from the host computer to thereby create printing image data and perform a printing, whereby it is possible to indicate that the RFID tag contained in the printed material must be invalidated, or indicate the cutting position of the RFID tag. When predetermined information is not recorded on the RFID tag of printing sheet P, a printing using an ordinary sheet can be performed.

Accordingly, when the recording medium with RFID tag is unused and discarded, the user of the present image forming apparatus can judge whether or not the RFID tag is to be broken, and can invalidate (make unreadable) the information contained in the memory of RFID tag, for example by cutting out the RFID tag along a cutting assistant line preliminarily printed on the recording medium, and then discard the recording medium without anxiety.

In the above description of the present embodiment, a case in which a sequence of the processes shown in the flowchart of FIG. 9 are performed in the ink jet printer 1000 side was taken as an example. However, the present invention is not limited to this example. For example, all or part of a sequence of the processes shown in the flowchart of FIG. 9 may be executed by a printer driver PD in the host computer HC side.

In the above description of the present embodiment, the image data of an RFID tag cutting assistant line is made to overlap the recording data on the same printing surface. However, the present invention is not limited to this example. The image indicating the presence of RFID tag or the image of an RFID tag cutting assistant line may be printed on the reverse of the printing surface of the recording data.

Example of Configuration of an Image Forming Apparatus According to Fifth Embodiment: Judging the Overlap of Images

[Features of the Present Embodiment]

In a ink jet printer according to the present embodiment, when the recording medium includes RFID tag, similarly to the ink jet printer according to Second Embodiment, an RFID tag cutting assistant line is made to overlap an image sent from the host computer before being printed, whereby a cutting assistant line for invalidating RFID tag can be printed on the recording medium. In this case, it is judged whether or not the printing range of data of characters and pictorial figures to be recorded sent from the host computer overlaps that of the RFID tag cutting assistant line, and only when the overlap therebetween does not exist, the RFID tag cutting assistant line is printed.

The ink jet printer according to the present embodiment will be described below. However, the ink jet printer according to the present embodiment is similar to the ink jet printer according to Second Embodiment, so an explanation of the corresponding drawings and details thereof will be omitted. Only the differences will be described below.

Figure 10:
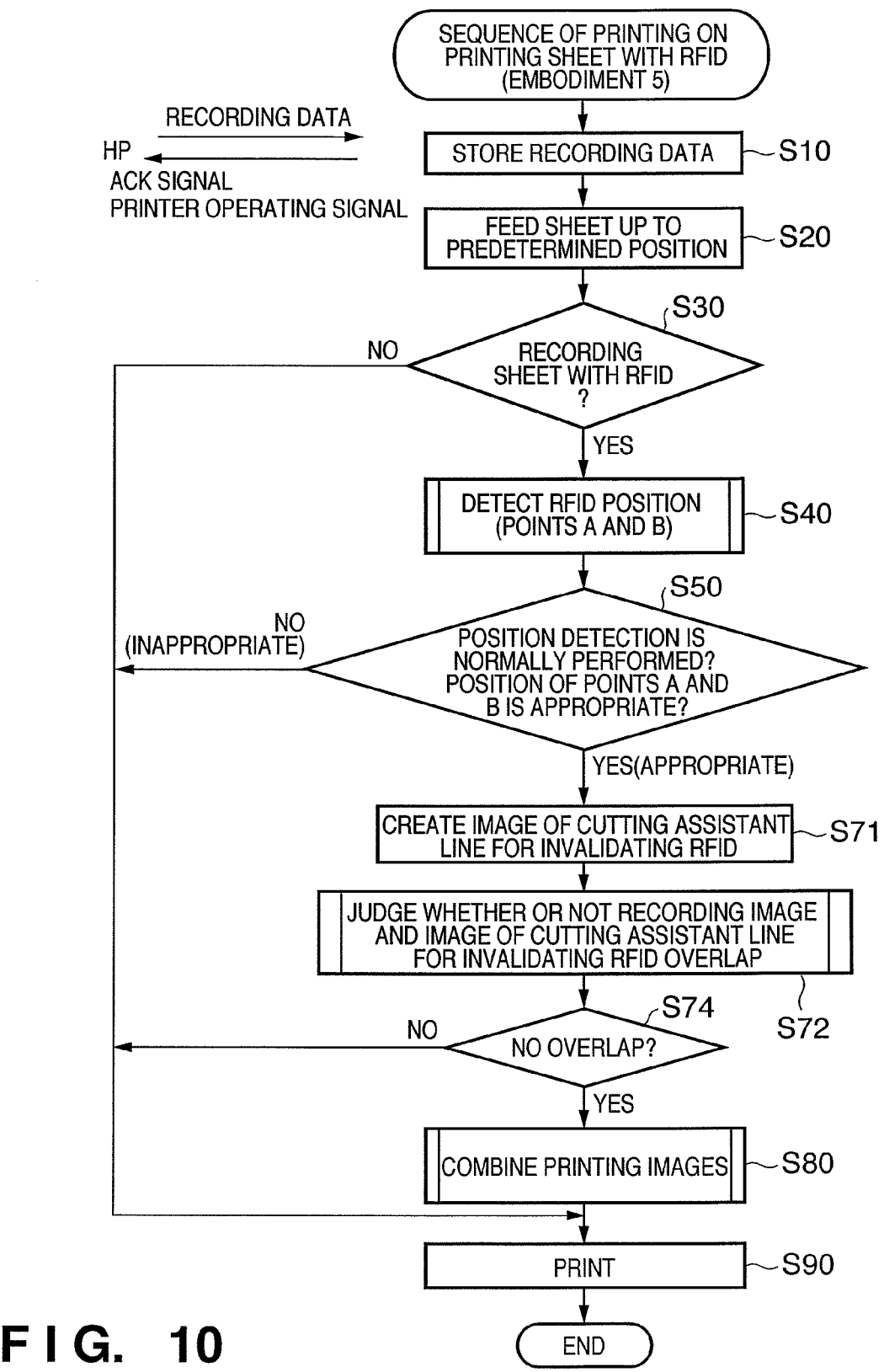
FIG. 10 is a flowchart showing a printing process according to Fifth Embodiment.

[Printing of a Cutting Assistant Line on a Sheet With RFID Tag: FIG. 10]

With reference to a flowchart of FIG. 10, there will be described a method for combining an image and a cutting assistant line allowing unused RFID tag to be easily cut out and printing the combined image, when the image is printed on a printing sheet P (a recording medium with RFID tag) by the ink jet printer 1000 according to the present embodiment. The processes shown in FIG. 10 are executed based on a control program stored in the ROM 1030, by the MPU 1010 in FIG. 2 using the RAM 1020 as a work area and controlling each unit.

[Steps S10 to S71: FIG. 10]

The processes from step S10 to step S71 shown in FIG. 10 are similar to those from step S10 to step S71 of Second Embodiment shown in FIG. 4, and hence repeated explanation thereof is omitted here.

[Step S72: FIG. 10]

Figure 11:
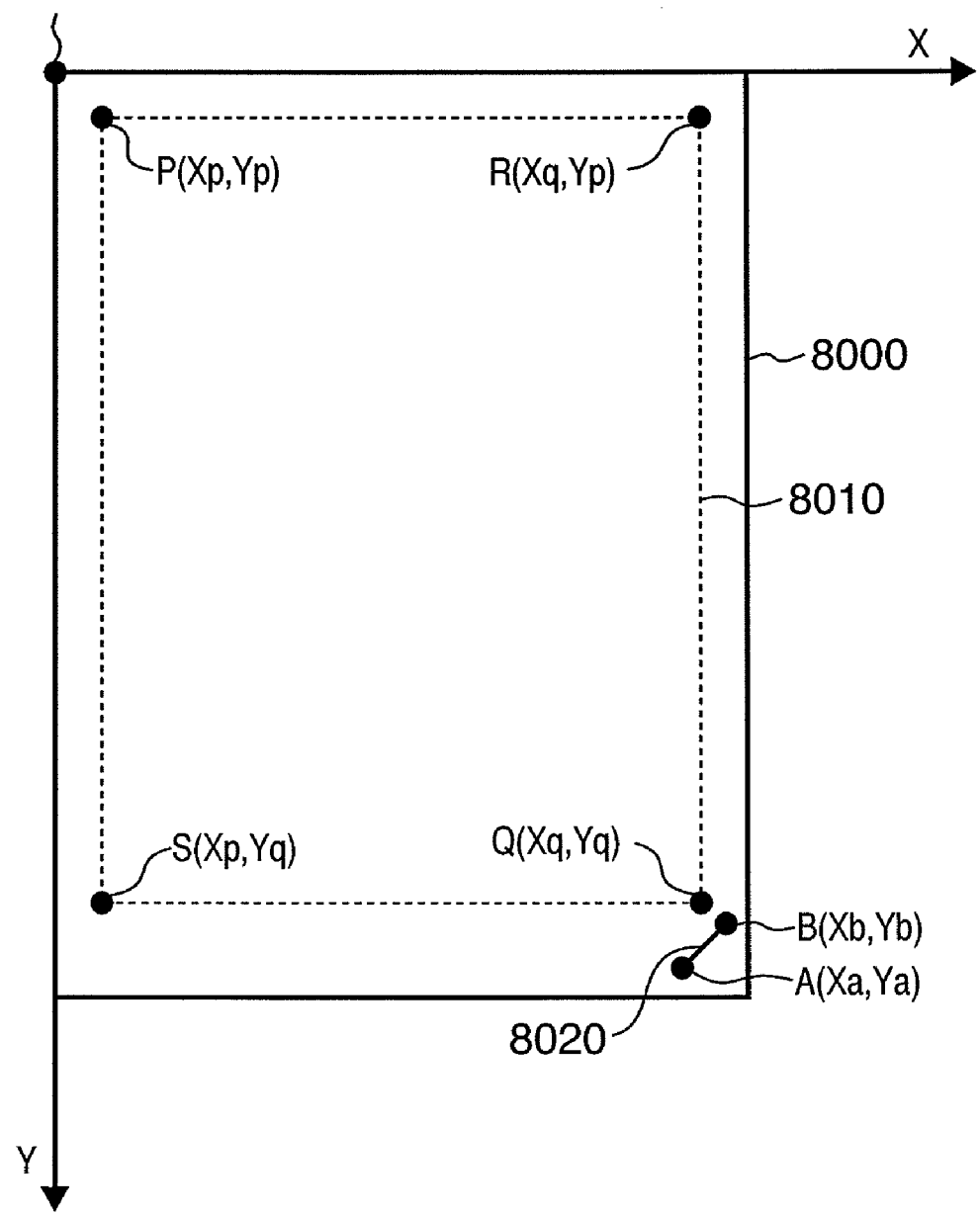
FIG. 11 is a view showing an example of printing range of printing data and an example of RFID tag cutting assistant line for assisting to cut.
Figure 12:
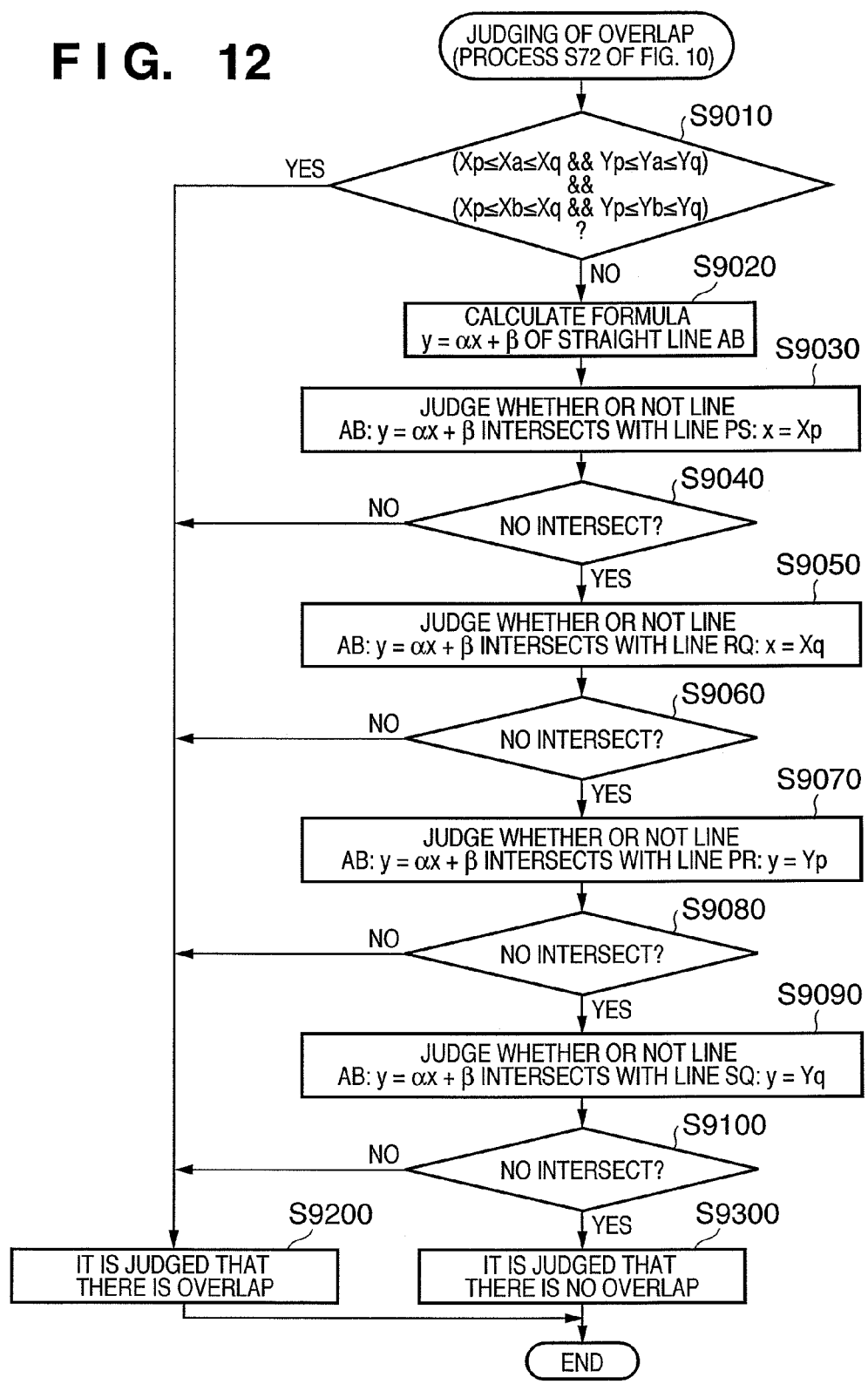
FIG. 12 is a flowchart showing details of an overlap judging process.

Subsequently, in step S72, the MPU 1010 judges whether or not the printing range of data of characters and pictorial figures to be recorded sent from the host computer HC 1500 overlaps that of the RFID tag cutting assistant line. Details of the judging of an overlap will be described with reference to a view of printing sheet P (FIG. 11) and a flowchart (FIG. 12).

[Judging of an Overlap: FIG. 11]

FIG. 11 is a view showing an example of printing range of printing data and an example of RFID tag cutting assistant line, both of which are printed on a printing sheet P. Reference numeral 8000 denotes a printing sheet P, and reference numeral 8010 denotes a range of printing data to be printed on the printing sheet P. More specifically, the range of printing data has a rectangular shape having points P, R, Q and S linked together. Reference numeral 8020 denotes an RFID tag cutting assistant line being a straight line linking point A with point B. Points A, B, P, Q, R and S each can be represented as the respective coordinates $(Xa, Ya)$, $(Xb, Yb)$, $(Xp, Yp)$, $(Xq<Yq)$, $(Xq, Yp)$ and $(Xp, Yq)$ in X and Y directions relative to point O. With reference to FIG. 12, there will be described a flow of processes for judging whether or not the above described range 8010 of printing data having points P, R, Q and S linked together overlaps the RFID tag cutting assistant line 8020 linking point A with point

[Processes for Judging an Overlap: FIG. 12]

[Step S9010: FIG. 12]

In step S9010, the MPU 1010 judges whether or not both of points A and B are inside the rectangle PRQS. When it is judged that both of points A and B are inside the rectangle PRQS, it is judged that the straight line AB overlaps the rectangle PRQS, and the flow jumps to S9200. When it is judged in step S9010 that any one of points A and B is not inside the rectangle PRQS, the flow proceeds to step S9020.

[Steps S9020 to 9040: FIG. 12]

Subsequently, in step S9020, formula $y=\alpha x+\beta$ representing the straight line AB is calculated, and then the flow proceeds to step S9030, in which the MPU 1010 judges whether or not line AB represented by formula $y=\alpha x+\beta$ intersects with line PS represented by formula $x=Xp$. Specifically, by assigning formula $x=Xp$ to formula $y=\alpha x+\beta$, coordinate y $y=\alpha \cdot Xp+\beta$ is calculated, whereby an intersecting point $(Xp, \alpha \cdot Xp+\beta)$ between line AB and line PS is calculated. Subsequently, in step S9040, by judging whether or not this value is positioned between point P and point S, it is judged whether or not line AB intersects with line PS. When it is judged in step S9040 that line AB intersects with line PS, it is judged that line AB overlaps rectangle PRQS, and the flow jumps to step S9200. When it is judged in step S9040 that line AB does not intersect with line PS, the flow proceeds to step S9050.

[Steps S9050 to S9300: FIG. 12]

Subsequently, similarly to when it is judged in steps S9030 to S9040 whether or not line AB intersects with line PS, it is judged in steps S9050 to S9060 whether or not line AB intersects with line RQ. Subsequently, similarly to when it is judged in steps S9030 to S9040 whether or not line AB intersects with line PS, it is judged in steps S9070 to S9080 whether or not line AB intersects with line PR. Subsequently, similarly to when it is judged in steps S9030 to S9040 whether or not line AB intersects with line PS, it is judged in steps S9090 to S9100 whether or not line AB intersects with line SQ. When it is judged that any one of lines RQ, PR and SQ intersects with line AB, it is judged that line AB overlaps rectangle PRQS, and the flow jumps to step S9200. Meanwhile, when it is judged that none of lines RQ, PR and SQ intersects with line AB, it is judged that line AB does not overlap rectangle PRQS, and the flow proceeds to S9300.

By virtue of a sequence of processes described above, the MPU 1010 can judge in step S72 of FIG. 10 whether or not the printing range of data of characters or images to be recorded, sent from the host computer HC 1500 overlaps the RFID tag cutting assistant line.

[Steps S74, S80 and S90: FIG. 10]

Subsequently, when it is judged by the MPU 1010 in step S74 of FIG. 10 that the overlap between the above printing range and the RFID tag cutting assistant line exists, the printing image combining process of step 80 is skipped, and the flow jumps to the printing process of step S90. Meanwhile, when it is judged by the MPU 1010 in step S74 that the overlap between the above printing range and the RFID tag cutting assistant line does not exist, the flow proceeds to step S80 in which the assistant line AB as the RFID tag cutting assistant line is combined with the recording data. Subsequently, in step S90, the MPU 1010 prints the combined recording data. Details of step S90 are similar to those of First or Second Embodiment, and hence an explanation thereof is omitted.

Summary

As described above, in the ink jet printer according to the present embodiment, it is judged whether or not the printing range of recording data of characters and pictorial figures to be recorded sent from the host computer HC 1500 overlaps the RFID tag cutting assistant line, and only when the overlap therebetween does not exist, the RFID tag cutting assistant line can be printed.

In the above description of the present embodiment, a case in which a sequence of the processes shown in the flowcharts of FIGS. 10 and 12 are performed in the ink jet printer 1000 side was taken as an example. However, the present invention is not limited to this example. For example, all or part of a sequence of the processes shown in the flowcharts of FIGS. 10 and 12 may be executed by a printer driver PD in the host computer HC side.

In the above description of the present embodiment, the image data of the RFID tag cutting assistant line is made to overlap the recording data on the same printing surface. However, the present invention is not limited to this example. The image data of the RFID tag cutting assistant line may be printed on the reverse of the printing surface of the recording data. In this case, the RFID tag cutting assistant line is printed on the rear surface, whereby the printing range of the RFID tag cutting assistant line can be prevented from overlapping that of the recording data at all times.

Example of Configuration of an Image Forming Apparatus According to Sixth Embodiment: Writing Into RFID Tag

[Features of the Present Embodiment]

In an ink jet printer according to the present embodiment, when the recording medium is provided with RFID tag, similarly to the ink jet printer according to First or Second Embodiment, an image indicating the presence of RFID tag or an RFID tag cutting assistant line is made to overlap an image sent from the host computer before being printed, whereby an image for invalidating RFID tag can be printed on the recording medium. Further, in the ink jet printer according to the present embodiment, in a case where predetermined user information can be written into the RFID tag, only when user information has been written into the RFID tag, an image indicating the presence of RFID tag or an RFID tag cutting assistant line is printed.

The ink jet printer according to the present embodiment will be described below. However, the ink jet printer according to the present embodiment is similar to the ink jet printer according to First or Second Embodiment, so an explanation of the corresponding drawings and details thereof will be omitted. Only the differences will be described below.

[Explanation of Data Table: FIG. 13]

FIG. 13 is a table showing a data configuration of a rewritable nonvolatile memory unit disposed within an IC unit 2040 of an RFID tag 2020 on a printing sheet P shown in 2010 of FIG. 1. The data table is divided into a sheet attribute information section D0010 preliminarily recorded on the printing sheet P and a user information section D0020 on which the user can record data at the time of printing.

More specifically, on the sheet attribute information section D0010, there are recorded: Pwx, Pwy, Ipx, Ipy, Iwx and Iwy (D1010) which are the arrangement position information of RFID tag; and country code, maker code, item code and check digit (D1020) which are the JAN code of printing sheet P. Meanwhile, further referring to the user information section D0020, there are recorded: photographing device name, photographing date, file name, exposure value and the like (D1030) which are image information; and fields for recording printer name, printing date, printing parameter and other values (D1040) which are printing information.

By collecting the user information from among the photographing attribute information of file (Exif information, for example) printed by the printer driver 1510 in the host computer 1500, the printing setting parameter of the printer driver, and the like, the values to be stored in each field are determined.

[Printing of a Cutting Assistant Line on a Sheet With RFID Tag: FIG. 14]

With reference to a flowchart of FIG. 14, there will be described a method for combining with an image an image indicating the presence of RFID tag or a cutting assistant line allowing unused RFID tag to be easily cut out, and then printing the combined image, when the image is printed on a printing sheet P (a recording medium with RFID tag) by the ink jet printer 1000 according to the present embodiment. The processes shown in FIG. 14 are executed based on a control program stored in the ROM 1030 by the MPU 1010 in FIG. 2A using the RAM 1020 as a work area and controlling each unit.

[Step S10]

The recording data to be recorded by the ink jet printer 1000 is sent from the host computer HC 1500 and stored in the receiving buffer RB of RAM 1020 via the input/output interface 1060.

[Step S15]

Subsequently, the user information collected by the printer driver 1510 in the host computer HC 1500 is sent from the host computer HC 1500 and stored in the receiving buffer RB of RAM 1020 via the input/output interface 1060. At this time, the MPU 1010 returns to the host computer HC1500 a signal for confirming the normal transfer of data, a signal indicating the operating state of printer 1000, and the like.

[Steps S20 to S30]

The subsequent steps S20 to S30 are similar to those described in First or Second Embodiment, and hence repeated explanation thereof is omitted here.

[Step S33]

Subsequently, in step S33, the MPU 1010 acquires the information stored in the receiving buffer RB of RAM 1020 and judges whether or not the user information is correctly contained therein. When it is judged in step S33 that the user information is correctly contained, it is judged that the user data exists, and the flow proceeds to step S35. Meanwhile, when it is judged in step S33 that the user information is not correctly contained, it is judged that the user data does not exist, and the flow jumps to step S90. Then the recording data is printed without a cutting assistant line for invalidating RFID being combined with the printing image.

[Steps S35 to S90]

Subsequently, in step S35, the MPU 1010 writes the user information into the user information field D0020 of RFID tag of printing sheet P via the RFID tag W/R connected via the input/output interface 1060. When the writing of the user information into the user information field D0020 is completed, the flow proceeds to step S40. Steps S40 to S90 are similar to those described in Second Embodiment, and hence repeated explanation thereof is omitted. Regarding the adjustment described in First Embodiment, also, repeated explanation is omitted.

Summary

As described above, in the ink jet printer according to the present embodiment, the user information written into RFID tag as well as the data of characters and pictorial figures to be recorded, sent from the host computer HC 1500, are acquired. In this case, only when the user information has been written into RFID tag, an image indicating the presence of RFID tag or an RFID tag cutting assistant line can be printed. Accordingly, in a case where the recording medium with RFID tag is unused and discarded, only when the user information being one piece of significant information has been stored in RFID tag, the user of the present image forming apparatus recognizes the breaking of RFID tag, and cuts the printing sheet P along the RFID tag cutting assistant line by use of a cutting tool such as scissors, as required, whereby the user can invalidate RFID tag and discard the printing sheet P without anxiety.

In the above description of the present embodiment, a case in which a sequence of the processes shown in the flowchart of FIG. 14 are performed in the ink jet printer 1000 side was taken as an example. However, the present invention is not limited to this example. All or part of a sequence of the processes shown in the flowchart of FIG. 14 may be executed by a printer driver PD in the host computer HC side.

In the above description of the present embodiment, the image indicating the presence of RFID tag or the image data of an RFID tag cutting assistant line is made to overlap the recording data on the same printing surface. However, the present invention is not limited to this example. The image data of an RFID tag cutting assistant line may be printed on the reverse of the printing surface of the recording data.

Example of Configuration of an Image Forming Apparatus According to Seventh Embodiment: Indication of Writing Into RFID Tag

[Features of the Present Embodiment]

In a ink jet printer according to the present embodiment, when the recording medium is provided with RFID tag, similarly to the ink jet printer according to First or Second Embodiment, an image indicating the presence of RFID tag or an RFID tag cutting assistant line is made to overlap an image sent from the host computer before being printed, whereby an image for invalidating RFID tag can be printed on the recording medium. Further, in the ink jet printer according to the present embodiment, in a case where predetermined user information can be written into RFID tag, when the user information has been written, a user data-written mark is printed; when the user information has not been written, a user data not-yet-written mark is printed. The ink jet printer according to the present embodiment will be described below. However, the ink jet printer according to the present embodiment is similar to the ink jet printer according to First Embodiment, so an explanation of the corresponding drawings and details thereof will be omitted. Only the differences will be described below.

[Explanation of Data Table: FIG. 13]

In the present embodiment, also, the data table of FIG. 13 is used as a table representing a data configuration of a nonvolatile memory unit within RFID tag. Each field of the data table is similar to that described in Sixth Embodiment. By collecting the user information from among the photographing attribute information of file (Exif information, for example) printed by the printer driver 1510 in the host computer 1500, the printing setting parameter of the printer driver, and the like, the values to be stored in each field are determined.

[Printing of a Cutting Assistant Line on a Sheet With RFID Tag: FIG. 15]

With reference to a flowchart of FIG. 15, there will be described a method for combining an image and a cutting assistant line allowing unused RFID tag to be easily cut out, and then printing the combined image, when the image is printed on a printing sheet P (a recording medium with RFID tag) by the ink jet printer 1000 according to the present embodiment. The processes shown in FIG. 15 are executed based on a control program stored in the ROM 1030, by the MPU 1010 in FIG. 2 using the RAM 1020 as a work area and controlling each unit.

[Steps S10 to S30]

Steps S10 to S30 of FIG. 15 are similar to those of Fifth Embodiment, and hence an explanation thereof is omitted.

[Step S33]

Subsequently, when it is judged in step S33 that the user data exists, the flow proceeds to step S35. When it is judged in step S33 that the user data does not exist, the flow jumps to step S77.

[Step S35]

Subsequently, in step S35, the MPU 1010 writes the user information into the user information field D0020 of RFID tag of printing sheet P via the RFID tag W/R connected via the input/output interface 1060. When the writing of the user information into the user information field D0020 is completed, the flow proceeds to step S75.

[Step S75 or S77]

Figure 16:
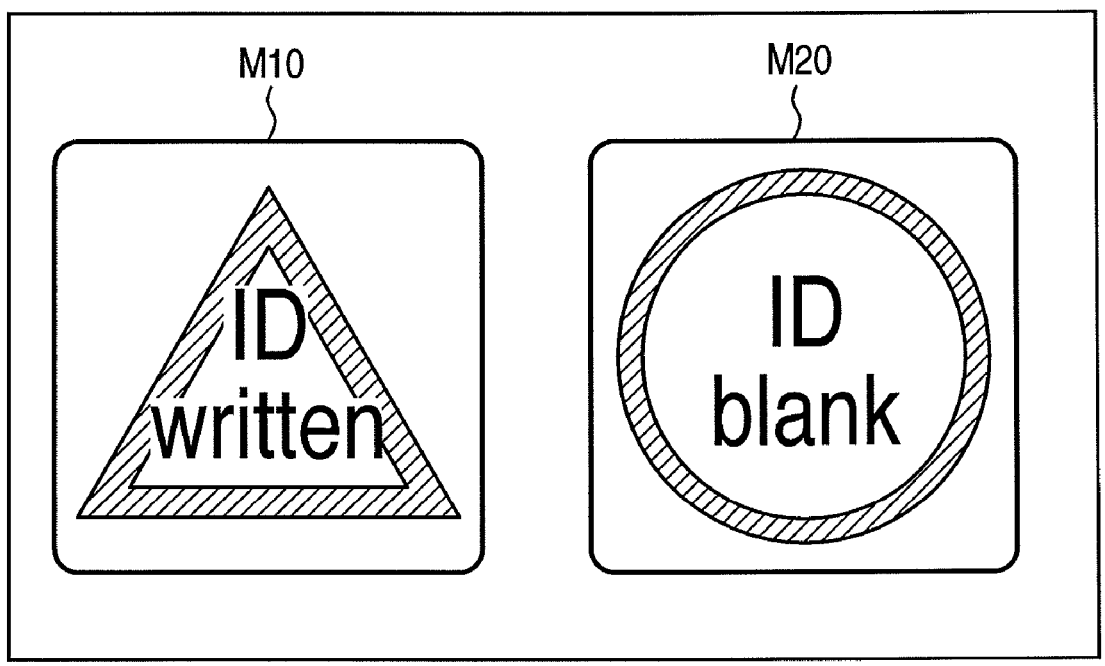
FIG. 16 is a view showing an example of a written mark and a not-yet-written mark.

Subsequently, in step S75, the MPU 1010 reads the bit map data of a written mark as shown in M1O of FIG. 16, preliminarily stored in ROM 1030, and creates the printing image information thereof, and then the flow proceeds to step S80. Meanwhile, in step S77, the MPU 1010 reads the bit map data of a blank mark as shown in M20 of FIG. 16, preliminarily stored in ROM 1030, and creates the printing image information thereof, and then the flow proceeds to step S80.

[Steps S80 to S90]

Subsequently, the MPU 1010 causes the image information created in step S75 or S77 to overlap the recording data. Subsequently, the overlapping data is printed in step S90. Details of step S90 is similar to those of First or Second Embodiment, and hence an explanation thereof is omitted.

Summary

As described above, in the ink jet printer according to the present embodiment, the user information written into RFID tag as well as the data of characters and pictorial figures to be recorded, sent from the host computer HC 1500, are acquired. In this case, when the user information has been written into RFID tag, an RFID tag information-written mark is printed; when the user information has not been written into RFID tag, an RFID tag information not-yet-written mark indicating the absence of storage of significant information is printed. Accordingly, the user of the present image forming apparatus can easily judge whether or not predetermined information has been written into RFID tag incorporated into the recording medium with RFID tag.

In the above description of the present embodiment, a case in which a sequence of the processes shown in the flowchart of FIG. 15 are performed in the ink jet printer 1000 side was taken as an example. However, the present invention is not limited to this example. All or part of a sequence of the processes shown in the flowchart of FIG. 15 may be executed by a printer driver PD in the host computer HC side.

In the above description of the present embodiment, the image data of a written mark or a not-yet-written mark is made to overlap the recording data on the same printing surface. However, the present invention is not limited to this example. The image data of a written mark or a not-yet-written mark may be printed on the reverse of the printing surface of the recording data.

Example of Configuration of an Image Forming Apparatus According to Eighth Embodiment: Indication of RFID Tag on the Rear Surface

[Features of the Present Embodiment]

In the present embodiment, there will be shown a procedure for printing on the reverse of the printing surface of the recording data the RFID tag indicating image described in the last part of First to Seventh Embodiments described above. Modified parts of the above described embodiments will be described below.

Figure 17:
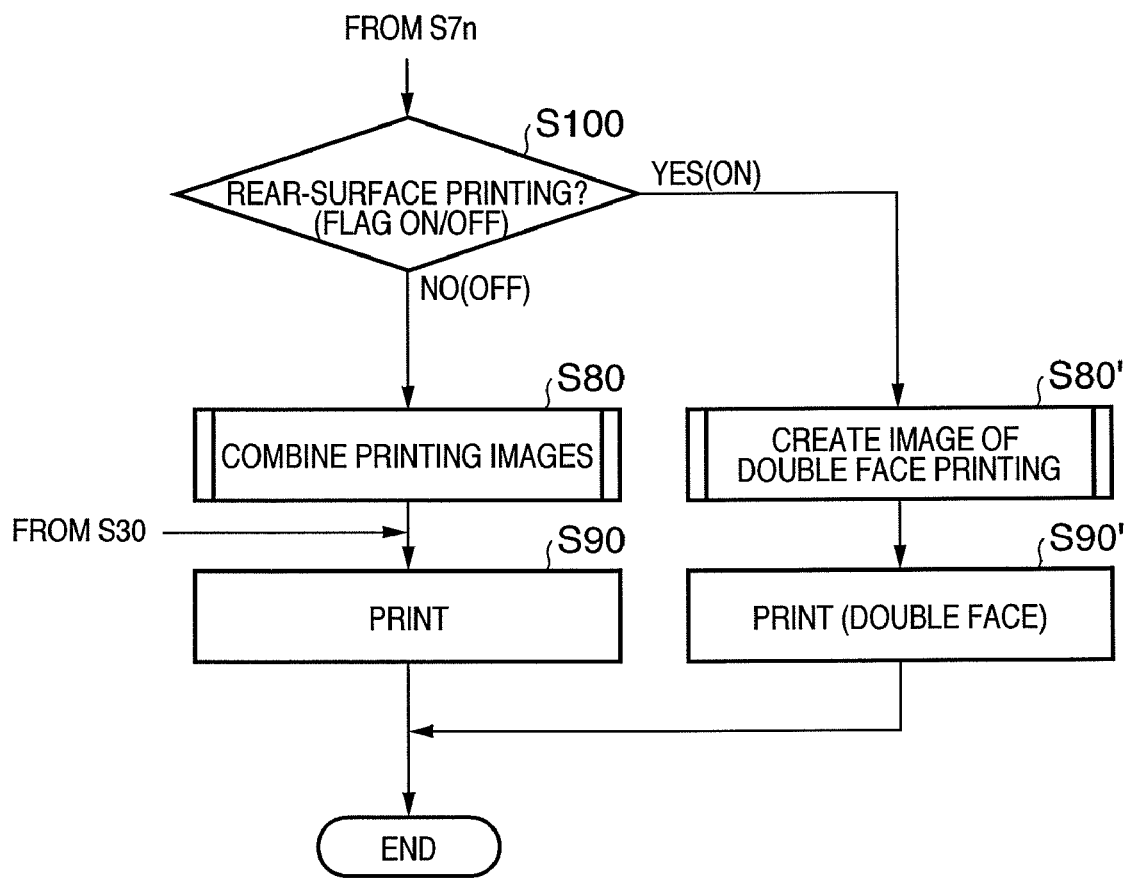
FIG. 17 is a flowchart showing a rear-surface printing process according to Eighth Embodiment.

[Printing on the Rear Surface of a Sheet With RFID Tag: FIG. 17]

A flowchart of modified parts allowing an RFID tag indicating image to be also printed on the rear surface is shown in FIG. 17. Expressions "from S7n" and "from S30" in FIG. 17 denote a proceeding after S70, S71, S75 or S77 of the embodiment and a proceeding after S30, respectively.

In step S100, it is judged according to a rear-surface printing flag 1028 shown in FIG. 2B specified by the user or by data from the host computer whether or not an RFID tag indicating image is to be printed on the rear-surface. If the rear-surface printing is not performed (if the rear-surface printing flag 1028 is in the OFF state), the flow proceeds to step S80 to perform the printing image combining process described in First Embodiment, and then prints the combined image in step S90. If the rear-surface printing is performed (if the rear-surface printing flag 1028 is in the ON state), the flow proceeds to step S80' to create images as a surface image and a rear-surface image, respectively, without combining printing images. In step S90', double face printing is performed by using the created surface image and rear-surface image.

When the recording data is double-face printed, only the recording data is printed on the rear surface in step S90, and the recording data combined with the RFID tag indicating image is printed on the rear surface in step S90'.

[Another Embodiment]

It will easily be appreciated that the object of the present invention can also be achieved when a recording medium (or a storage medium) having recorded thereon a program code of software for implementing the functions of the above described embodiments is supplied to a system or an apparatus, and a computer (or a CPU or MPU) of the system or apparatus reads and executes the program code stored in the recording medium. In this case, the program code itself read from the recording medium implements the functions of the above described embodiments, and the recording medium having recorded thereon the program code constitutes the present invention.

It will easily be appreciated that the functions of the above described embodiments are implemented not only when the program code read by the computer is executed, but also when part or all of the practical processes is performed by the operating system (OS) and the like running on the computer based on the instruction of the above program code.

It will easily be appreciated that when the program code read from the recording medium is written into a memory provided in a function expansion card inserted into the computer or in a function expansion unit connected to the computer, and based on the instructions of the program code, part or all of the practical processes is performed by the CPU or the like provided in the function expansion card or the function expansion unit, then the functions of the above described embodiments are implemented by the above processes.

Also included in the present invention is an embodiment in which the functions of the above described embodiments are implemented when program data for implementing the functions of the above described embodiments is downloaded from a CD-ROM installed in the self apparatus or an external supply source such as the Internet into a memory of the self apparatus.

When the present invention is applied to the recording medium described above, program codes corresponding to the above described flowcharts (FIGS. 3 to 5, 9 to 10, 12, 14 to 15, and 17) are preferably stored in the recording medium.

The present invention is not limited to the above embodiments, and various changes and modification can be made thereto within the spirit and scope of the present invention. Therefore, to apprise the public of the scope of the present invention, the following claims are made.

This application claims the benefit of Japanese Application No. 2005-035212, filed on Feb. 10, 2005, which is hereby incorporated by reference herein in its entirety.

What is claimed is:

1. An image forming apparatus for forming an output image on a recording medium according to an input image signal, comprising:

radio frequency tag detection means for detecting whether or not a radio frequency tag is arranged in a recording medium supplied for forming an output image; and image forming control means for controlling to generate and form an additional image indicating the presence of the radio frequency tag on the recording medium, when said radio frequency tag detection means detects that the radio frequency tag is arranged in the recording medium, wherein the radio frequency tag includes storage means for storing information, said radio frequency tag detection means reads position information indicating an arrangement position of the radio frequency tag from data stored in the storage means, said image forming control means generates and forms the additional image further serving as a mark of the arrangement position of the radio frequency tag, based on the position information, and the additional image indicating the presence of the radio frequency tag generated and formed by said image forming control means includes a cutting assistant line for cutting at least an antenna of the radio frequency tag, the cutting assistant line indicating a position where the radio frequency tag can be broken.

2. The image forming apparatus according to claim 1 further comprising judging means for judging whether or not significant information to be eliminated exists in the radio frequency tag, wherein when said judging means judges that significant information exists in the radio frequency tag, said image forming control means generates and forms the additional image indicating the presence of the radio frequency tag on the recording medium.

3. The image forming apparatus according to claim 1, wherein said image forming control means forms the additional image as a background of the output image or with a color and/or density which does not erase the output image information, when the output image to be recorded on the recording medium and the additional image overlap.

4. The image forming apparatus according to claim 1, wherein said image forming control means includes means for controlling to prevent the output image to be recorded on the recording medium and the additional image from overlapping.

5. The image forming apparatus according to claim 1, wherein said image forming control means includes means for controlling to form the output image to be recorded on a surface of the recording medium and the additional image to be formed on another surface of the recording medium.

6. The image forming apparatus according to claim 1, further comprising recording means for recording the output image with the additional image on the recording medium under a control of said image forming control means.

7. The image forming apparatus according to claim 2, wherein the radio frequency tag includes storage means for storing information, and said judging means judges whether or not significant information exists in the radio frequency tag, from data read from the storage means by said radio frequency tag detection means.

8. The image forming apparatus according to claim 2, wherein the radio frequency tag includes storage means for storing information, and said judging means judges that significant information exists in the radio frequency tag, from an operation of storing information into the storage means.

9. The image forming apparatus according to claim 2, wherein the additional image indicating the presence of the radio frequency tag includes information indicating whether or not significant information exists in the radio frequency tag.

10. A method of controlling an image forming apparatus for forming an output image on a recording medium according to an input image signal, said method comprising the steps of:

detecting whether or not a radio frequency tag is arranged in a recording medium supplied for forming an output image; and controlling to generate and form an additional image indicating the presence of the radio frequency tag on the recording medium, when it is detected that the radio frequency tag is arranged in the recording medium in said detecting step, wherein the radio frequency tag includes storage means for storing information, in said detecting step, position information indicating an arrangement position of the radio frequency tag is read from data stored in the storage means, in said controlling step, the additional image is formed to further serve as a mark of arrangement position of the radio frequency tag, based on the position information, and the additional image indicating the presence of the radio frequency tag generated and formed in said controlling step includes a cutting assistant line for cuffing at least an antenna of the radio frequency tag, the cutting assistant line indicating a position where the radio frequency tag can be broken.

11. The method according to claim 10, further comprising a step of judging whether or not significant information to be eliminated exists in the radio frequency tag, wherein in said controlling step, the additional image indicating the presence of the radio frequency tag on the recording medium, when it is judged that significant information exists in the radio frequency tag in said judging step.

12. A computer-readable storage medium embodying a computer-executable program for causing an apparatus to implement the method of controlling an image forming apparatus according to claim 10.

13. The method according to claim 11, wherein the radio frequency tag includes storage means for storing information, and in said judging step, it is judged from data read from the storage means whether or not significant information exists in the radio frequency tag.

14. The method according to claim 11, wherein the radio frequency tag includes storage means for storing information, and in said judging step, it is judged from an operation of storing information into the storage means that significant information exists in the radio frequency tag.

* * * * *